US011836543B2

(12) United States Patent
Kumar Agrawal et al.

(10) Patent No.: US 11,836,543 B2
(45) Date of Patent: Dec. 5, 2023

(54) ELECTRONIC DEVICES AND CORRESPONDING METHODS FOR REDIRECTING EVENT NOTIFICATIONS IN MULTI-PERSON CONTENT PRESENTATION ENVIRONMENTS

(71) Applicant: Motorola Mobility LLC, Chicago, IL (US)

(72) Inventors: Amit Kumar Agrawal, Bangalore (IN); Yonghua Hu, Jiangsu (CN)

(73) Assignee: Motorola Mobility LLC, Chicago, IL (US)

( * ) Notice: Subject to any disclaimer, the term of this patent is extended or adjusted under 35 U.S.C. 154(b) by 59 days.

(21) Appl. No.: 17/369,389

(22) Filed: Jul. 7, 2021

(65) Prior Publication Data
US 2022/0405154 A1    Dec. 22, 2022

(30) Foreign Application Priority Data
Jun. 17, 2021    (CN) .......................... 202110672481.0

(51) Int. Cl.
*G06F 9/54*    (2006.01)
*G02B 27/01*    (2006.01)
(Continued)

(52) U.S. Cl.
CPC ........... *G06F 9/542* (2013.01); *G02B 27/017* (2013.01); *H04L 67/55* (2022.05); *H04N 13/183* (2018.05);
(Continued)

(58) Field of Classification Search
None
See application file for complete search history.

(56) References Cited

U.S. PATENT DOCUMENTS 10,234,688 B2    3/2019    DeBates et al.
10,334,303 B1    6/2019    Chung
(Continued)

FOREIGN PATENT DOCUMENTS

| CN | 103188506 A | * | 1/2013 | ........... H04N 13/349 |
| CN | 203279075 U | * | 11/2013 | ........... H04N 13/398 |
| WO | WO2010151284 A1 | * | 12/2010 | ......... H04L 65/1094 |

OTHER PUBLICATIONS

Langhnoia, Kunal N., "Non-Final Office Action", U.S. Appl. No. 17/369,427; filed Jul. 7, 2021; dated Aug. 31, 2022.

*Primary Examiner* — Charles E Anya
(74) *Attorney, Agent, or Firm* — Philip H. Burrus, IV

(57) ABSTRACT

An electronic device includes a communication device electronically communicating with a content presentation companion device operating as a primary display for the electronic device and at least one augmented reality companion device. One or more sensors detect multiple persons within an environment while the content presentation companion device operates as the primary display. One or more processors redirect an event notification intended for presentation on the primary display to the augmented reality companion device while both the content presentation companion device operates as the primary display for the electronic device and the multiple persons are within the environment of the electronic device. When communicating with two augmented reality companion devices, the one or more processors can direct subtitles associated with a content offering, sometimes in different languages, to at least a first augmented reality companion device and a second augmented reality companion device.

20 Claims, 10 Drawing Sheets

(51) Int. Cl.
  *H04N 13/183*  (2018.01)
  *H04W 4/80*  (2018.01)
  *H04L 67/55*  (2022.01)

(52) U.S. Cl.
  CPC ......... *H04W 4/80* (2018.02); *G02B 2027/014* (2013.01)

(56) References Cited

U.S. PATENT DOCUMENTS

| | | |
|---|---|---|
| 10,360,713 B1 | 7/2019 | Arana |
| 10,506,650 B1 | 12/2019 | Alameh |
| 10,757,323 B2 | 8/2020 | Alameh et al. |
| 10,827,455 B1 | 11/2020 | Agrawal et al. |
| 10,896,591 B2 | 1/2021 | Alameh et al. |
| 10,965,122 B2 | 3/2021 | Agrawal et al. |
| 2011/0181780 A1* | 7/2011 | Barton ............... H04N 21/4334 348/563 |
| 2012/0169854 A1* | 7/2012 | Seo ........................ G09G 5/003 348/56 |
| 2012/0240177 A1* | 9/2012 | Rose .................. H04N 21/4788 725/116 |
| 2013/0059526 A1* | 3/2013 | Moore .................. G09F 21/026 455/3.06 |
| 2013/0063578 A1* | 3/2013 | Uesaka ............... H04N 13/341 348/53 |
| 2014/0143674 A1* | 5/2014 | Kruglick ............... G06F 3/1454 715/738 |
| 2020/0201038 A1 | 6/2020 | Gelman et al. |

* cited by examiner

ELECTRONIC DEVICES AND CORRESPONDING METHODS FOR REDIRECTING EVENT NOTIFICATIONS IN MULTI-PERSON CONTENT PRESENTATION ENVIRONMENTS

CROSS REFERENCE TO PRIOR APPLICATIONS

This application claims priority and benefit under 35 U.S.C. § 119 from Chinese Patent Application No. 202110672481.0, filed Jun. 17, 2021, which is incorporated by reference by rule in accordance with 37 CFR § 1.57.

BACKGROUND

Technical Field

This disclosure relates generally to electronic devices, and more particularly to electronic devices configured to electronically generate or receive notifications.

Background Art

The technology associated with portable electronic devices, such as smartphones and tablet computers, is continually improving. Illustrating by example, while not too long ago such devices included only grey scale liquid crystal diode displays with large, blocky pixels, modern smartphones, tablet computers, and even smart watches include organic light emitting diode (OLED) displays with incredibly small pixels.

While these OLED displays offer extremely high contrast ratios capable of presenting high dynamic range images and videos, their size remains limited so that these devices can be easily carried in a hand, pocket, or backpack. To enable content received by these devices to be more easily seen, such as when a group wants to watch the content for example, many portable electronic devices include a content redirection feature. Using the content redirection feature, a person may stream a movie through a smartphone, but then redirect the movie to a larger display situated near the smartphone so that a family or other group can watch the movie on the larger display. While great for watching the movie, the redirection feature can affect other features of the device such as notification delivery. It would be advantageous to have an improved electronic device with user interface features allowing for improved content delivery.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
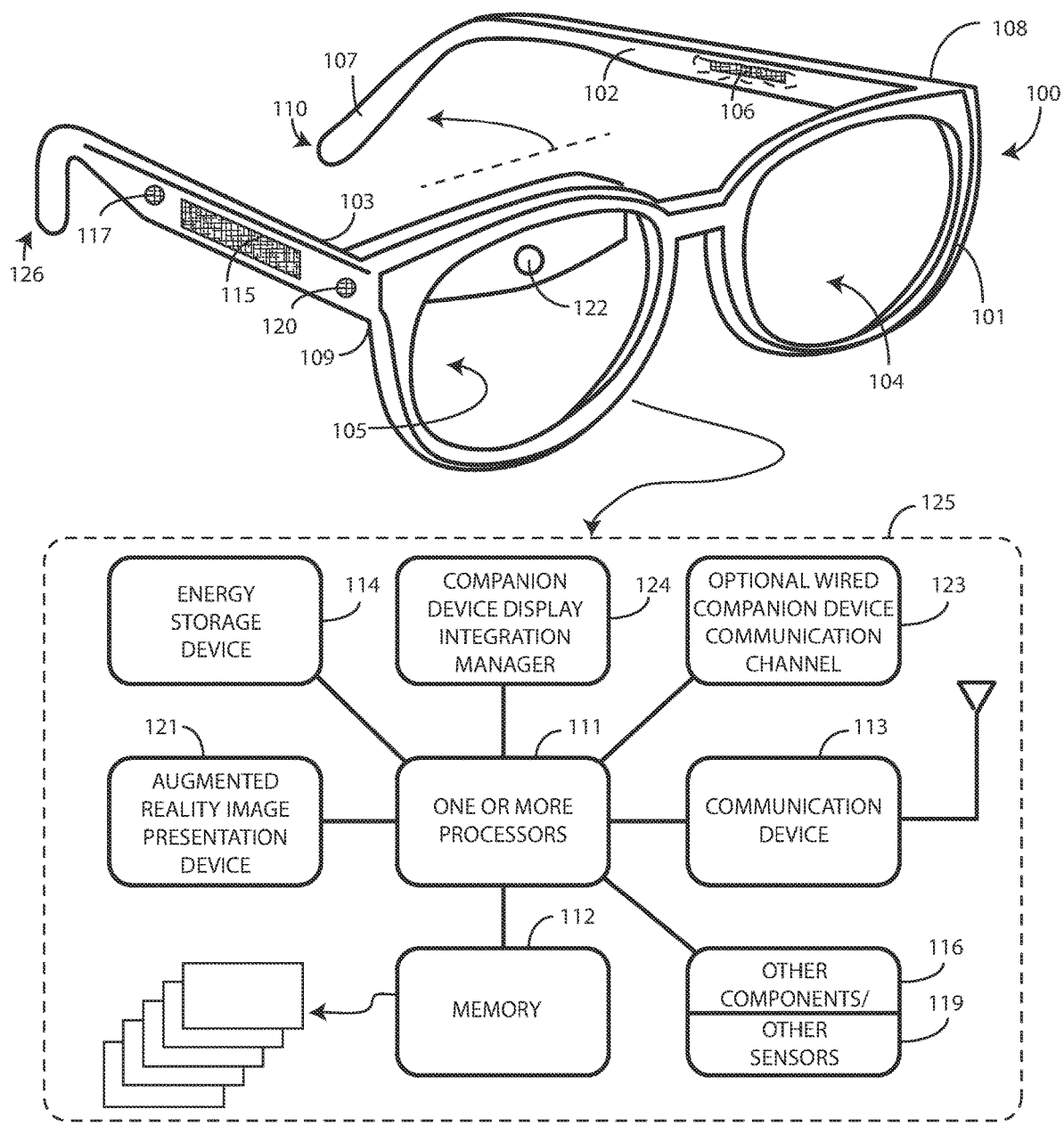
FIG. 1 illustrates one explanatory augmented reality companion device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to redirecting an event notification intended for presentation on a primary display of an electronic device to an augmented reality companion device when multiple persons are within an environment of the electronic device or, alternatively, delivering subtitles to augmented reality companion devices in accordance with user language preferences. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of redirecting event notifications and/or sending subtitles to an augmented reality companion device as described herein. The non-processor circuits may include, but are not limited to, a radio receiver, a radio transmitter, signal drivers, clock circuits, power source circuits, and user input devices. As such, these functions may be interpreted as steps of a method to perform the redirection of event notifications and/or transmission of subtitles to the augmented reality companion device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an augmented reality companion device, which is configured as a pair of augmented reality glasses in an explanatory embodiment, which can receive information from an electronic device when the electronic device is redirecting its primary display to a content presentation companion device. Advantageously, this allows the information to be delivered only to intended recipients, rather than to a group who may be consuming the content on the content presentation companion device.

The information can take a variety of forms. In one or more embodiments, the information comprises an event notification, which alerts the user to the fact that a notification has been generated or received. Examples of event notifications include notifications that an email has been received, notifications that a text message has been received, news alerts, weather alerts, news that new social media posts have been made, and so forth. In other embodiments, the information can comprise subtitles associated with content offerings. In some embodiments, audio content is redirected along with the information. If, for example, two people are watching a movie while wearing augmented reality glasses, and those people speak two different languages, one or more processors of an electronic device can cause a communication device to electronically delivery subtitles associated with the content in preferred languages to the augmented reality glasses without cluttering the display of the content presentation companion device. Optionally, audio in their preferred language or in another language can be delivered along with the subtitles as well. Other examples of such information will be described below. Still others will be obvious to those of ordinary skill in the art having the benefit of this disclosure.

In one or more embodiments, one or more processors of an electronic device detect that a communication device of the electronic device is in communication with both a content presentation companion device operating as a primary display for the electronic device and at least one augmented reality companion device, one example of which are augmented reality glasses. One or more sensors then detect multiple persons being present within an environment of the electronic device while the content presentation companion device is operating as the primary display for the electronic device. When this occurs, the one or more processors redirect an event notification intended for presentation on the primary display of the electronic device to the augmented reality companion device while the multiple persons are in the environment.

To illustrate, consider the situation where a family is sitting in a living room around a large television screen. The mother of the family causes a movie to be streamed to her smartphone. Since the screen is too small for the family to comfortably watch together, she redirects the movie from the smartphone to the television screen, which serves as a content presentation companion device by functioning as the primary display for the smartphone.

Ordinarily, if the mother's employer sent a work email or text message to the mother via her smartphone, an event notification would be generated indicating that the email or text message had been received. Ordinarily, this event notification would be presented on the display of the smartphone. However, the redirection of display functionality to the content presentation companion device would ordinarily now cause the event notification to be presented on the television screen. If this happened at a key point in the movie, the whole family would be annoyed due to the interruption of the action for a work email or text message intended only for the mother.

Advantageously, using embodiments of the disclosure, the smartphone uses one or more sensors to detect that multiple persons, i.e., the family in this example, are within the environment of the electronic device defined by the living room. When the mother is using an augmented reality companion device, such as by wearing augmented reality glasses, one or more processors of the smartphone detect that the communication device of the smartphone is electronically in communication with both the television screen and the augmented reality glasses. Accordingly, in one or more embodiments the one or more processors will redirect the event notification from the television screen to the augmented reality glasses so that only the mother sees the event notification. This results in the intended recipient of the event notification seeing the event notification, thereby allowing the rest of the family to watch the movie without interruption.

Embodiments of the disclosure can be used in other ways as well. In one or more other embodiments one or more processors of an electronic device cause a communication device to electronically delivery a content offering such as a movie, video, television show, webpage, email, or application interface, to a content presentation companion device for presentation to an environment of the electronic device. The one or more processors also detect the communication device electronically being in communication with both a first augmented reality companion device and a second augmented reality companion device.

One or more sensors of the electronic device then identify a first person operating the first augmented reality companion device and a second person operating the second augmented reality companion device. The one or more processors then determine a first language preference of the first person and a second language preference of the second person. The one or more processors then cause the communication device to electronically deliver first subtitles associated with the content in the first language preference to the first augmented reality companion device and second subtitles associated with the content in the second language preference to the second augmented reality companion device.

To illustrate, consider the situation where two people are sitting in a room where one person is streaming an American movie with English dialogue from a smartphone to a large television screen. Each person is wearing augmented reality glasses, which are configured as augmented reality companion devices to the smartphone. Additionally, each person is learning a different language, with a first person learning French and a second person learning Spanish. Accordingly, using a menu or other device settings, the first person sets a first language preference to French and a second language preference for the other person to Spanish.

One or more processors of the smartphone detect that the communication device of the smartphone is electronically in communication with each of the television screen (to project the content) and the first pair of augmented reality glasses and the second pair of augmented reality glasses. One or more sensors of the electronic device identify the first person and the second person. The one or more processors determine, from the user settings, that the first language preference of the first person is French and the second language preference of the second person is Spanish. Accordingly, the one or more processors cause the communication device of the smartphone to deliver first subtitles to the first pair of augmented reality glasses in French and second subtitles to the second pair of augmented reality glasses in Spanish. Each person gets to hear the dialogue of the movie in English while reading the language they are learning, but without disrupting the other person's enjoyment of the movie and learning experience.

Embodiments of the disclosure contemplate that when an electronic device, such as a smartphone or tablet computer, is electronically in communication with a companion display device, multiple people may be watching the companion display device. This can occur whenever a companion device is being used as the primary display for the electronic device. When event notifications are received, in prior art systems the owner of the smartphone would only have two options in managing such event notifications: First, they could transition the electronic device to a "do not disturb" mode of operation to prevent the event notifications from being displayed to the group and distracting from the content being presented on the companion display device. The problem with this is that the owner of the electronic device will at least temporarily miss event notifications, which may be time sensitive or important. Additionally, the owner of the electronic device may feel like they are missing out on full use of their electronic device.

Second, the owner of the electronic device can simply allow event notifications to be presented on the companion display device just as they would ordinarily be presented on the display of the electronic device. This option is problematic as well, as the other people consuming the content at the companion display device are continually distracted by the presentation of event notifications. Additionally, the privacy of owner of the electronic device can be compromised if event notifications containing sensitive information are presented to the group.

While some people are fortunate enough to have an additional companion electronic device, such as a smart watch capable of presenting event notifications, many cannot afford such an option. Additionally, the owner of the companion electronic device would need to turn their attention away from the companion display device any time an event notification was delivered. They would therefore not be able to simultaneously enjoy the content on the companion display device while checking the event notifications.

Advantageously, embodiments of the disclosure provide a solution to these issues by using augmented reality glasses as an augmented reality companion device, thereby allowing an owner of an electronic device to remain connected to their electronic device while consuming content on a companion electronic device such as an external display.

In one or more embodiments, an electronic device determines that the electronic device is connected to an external display in a content sharing mode, such as when the electronic device is in a content redirection mode or a "desktop" mode where the external display serves as the primary display for the electronic device. The electronic device additionally determines that the electronic device is in communication with augmented reality glasses. The electronic device determines that content on the external display is being consumed by more than one user in addition to the owner of the electronic device. In one or more embodiments, this occurs by capturing pictures of the environment to determine multiple persons are within the environment.

In one or more embodiments, the electronic device determines that an owner of the electronic device is wearing augmented reality glasses. The electronic device determines that an event notification is about to be displayed. One or more processors of the electronic device then actively route private event notifications to the augmented reality glasses in response to such situations.

In one or more embodiments, this active routing occurs as a function of a preconfigured or user selectable private notifications list. Each list item in the preconfigured or user selectable private notifications list could be a new message notice, an incoming call notice, a notice from a specific application, and so forth.

In other embodiments, the active routing occurs as a function of a target display decision-making mechanism based upon a private notifications list. For example, if an electronic mail message is directed to the whole group consuming the content with the companion display device, the decision-making mechanism can route the event notification indicating the electronic mail message has been received to the companion display device. By contrast, if the electronic mail message were directed only to the owner of the electronic device, the decision-making mechanism may direct the message to the owner's augmented reality glasses.

In still another embodiment, the active routing occurs as a function of an action based upon a target display decision. Private event notifications and content would then be directed to augmented reality glasses, while public event notification could be routed to another display or another device.

In other embodiments, the augmented reality glasses are used for the delivery of subtitles corresponding to the content being consumed on the companion display device. In such an embodiment, an electronic device determines that it is electronically connected to a companion display device functioning as the primary display of the electronic device. The electronic device then determines that more than one person in addition to the owner of the electronic device is consuming the content being delivered to the companion display device.

The electronic device then determines that it is electronically connected to more than one pair of augmented reality glasses apart from the augmented reality glasses of the owner. The electronic device determines that content being rendered on the companion display device supports subtitles in more than one format, e.g., in more than one language. One or more processors of the electronic device determine language preferences for each user wearing augmented reality glasses. This can be done using pre-configured settings or dynamic detection of the language by processing audio received by a microphone using speech recognition.

When the electronic device determines that multiple users are wearing different augmented reality glasses that are electronically in communication with the electronic device, one or more processors of the electronic device route preferred subtitles (different languages) for individual users based upon their preferences.

Illustrating by example, if a Chinese person and an Indian person are watching a movie streamed to the electronic device and delivered to the companion display devices that includes dialogue in English, one or more processors of the electronic device may deliver subtitles in Mandarin to the augmented reality glasses being worn by the Chinese person and other subtitles in Hindi to the augmented reality glasses being worn by the Indian person. It should be noted that this concept could be extended to cater to other situations supporting multiple languages such as game scores, song lyrics, and so forth. Other situations in which it would be advantageous to route subtitles in different languages to augmented reality glasses in communication with an electronic device directing content offerings to a companion display device will be obvious to those of ordinary skill in the art having the benefit of this disclosure.

Turning now to FIG. 1, illustrated therein is one explanatory augmented reality companion device 100 configured in accordance with one or more embodiments of the disclosure. In the illustrative embodiment of FIG. 1, the augmented reality companion device 100 comprises augmented reality glasses. However, this is for explanatory purposes only, as the augmented reality companion device 100 could be configured in any number of other ways as well. Illustrating by example, the augmented reality companion device 100 could also be configured as any of sunglasses, goggles, masks, shields, or visors. Other forms of the augmented reality companion device 100 will be obvious to those of ordinary skill in the art having the benefit of this disclosure.

The augmented reality companion device 100 of FIG. 1 includes a frame 101 and one or more stems 102,103. Here, the one or more stems 102,103 comprise a first stem 102 and a second stem 103. One or more lenses 104,105 can be disposed within the frame 101. The lenses 104,105 can be prescription or non-prescription, and can be clear, tinted, or dark. In one or more embodiments the stems 102,103 are pivotable from a first position where they are situated adjacent to, and parallel with, the frame 101, to a second, radially displaced open position shown in FIG. 1. However, in other embodiments the stems 102,103 may be fixed relative to the frame 101. In still other embodiments, such as might be the case if the augmented reality companion device 100 were configured as goggles, the stems 102,103 may be flexible or soft. For example, the stems of goggles are frequently elasticized fabric, which is soft, flexible, pliable, and stretchy. Other types of stems 102,103 will be obvious to those of ordinary skill in the art having the benefit of this disclosure.

In one or more embodiments the stems 102,103 attach to the frame 101 at a first end 108,109 and extend distally from the frame 101 to a second, distal end 110,126. In one embodiment, each stem 102,103 includes a temple portion 106 and an ear engagement portion 107. The temple portion 106 is the portion of the stem 102,103 passing from the frame 101 past the temple of a wearer, while the ear engagement portion 107 engages the wearer's ear to retain the augmented reality glasses to the wearer's head.

Since the augmented reality companion device 100 is configured as an electronic device, one or both of the frame 101 and the stems 102,103 can comprise one or more electrical components. These electrical components are shown illustratively in a schematic block diagram 125 in FIG. 1. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors 111. The one or more processors 111 can be disposed in one or both of the stems 102,103 or the frame 101. The one or more processors 111 can be operable with a memory 112. The one or more processors 111, which may be any of one or more microprocessors, programmable logic, application specific integrated circuit device, or other similar device, are capable of executing program instructions and methods described herein. The program instructions and methods may be stored either on-board in the one or more processors 111, or in the memory 112, or in other computer readable media coupled to the one or more processors 111.

The one or more processors 111 can be configured to operate the various functions of the augmented reality companion device 100, and also to execute software or firmware applications and modules that can be stored in a computer readable medium, such as memory 112. The one or more processors 111 execute this software or firmware, in part, to provide device functionality. The memory 112 may include either or both static and dynamic memory components, may be used for storing both embedded code and user data.

In one or more embodiments, the augmented reality companion device 100 also includes an optional wireless communication device 113. Where included, the wireless communication device 113 is operable with the one or more processors 111, and is used to facilitate electronic communication with one or more electronic devices or servers or other communication devices across a network. Note that it is possible to combine the one or more processors 111, the memory 112, and the wireless communication device 113 into a single device, or alternatively into devices having fewer parts while retaining the functionality of the constituent parts.

The wireless communication device 113, which may be one of a receiver or transmitter, and may alternatively be a transceiver, operates in conjunction with the one or more processors 111 to electronically communicate through a communication network. For example, in one embodiment, the wireless communication device 113 can be configured to communicate through a traditional cellular network. Other examples of networks with which the communication circuit may communicate include proprietary networks and direct communication networks. In other embodiments, the wireless communication device 113 can communicate with near field or local area networks, infrared communication circuits, magnetic field modulation circuits, and Wi-Fi circuits. In one or more embodiments, the wireless communication device 113 can be configured to provide messaging functionality to deliver electronic messages to remote devices.

A battery 114 or other energy storage device can be included to provide power for the various components of the augmented reality companion device 100. While a battery 114 is shown in FIG. 1, it will be obvious to those of ordinary skill in the art having the benefit of this disclosure that other energy storage devices can be used instead of the battery 114, including a micro fuel cell or an electrochemical capacitor. The battery 114 can include a lithium ion cell, lithium polymer cell, or a nickel metal hydride cell, such cells having sufficient energy capacity, wide operating temperature range, large number of charging cycles, and long useful life. The battery 114 may also include overvoltage and overcurrent protection and charging circuitry. In one embodiment, the battery 114 comprises a small, lithium polymer cell.

In one or more embodiments, a photovoltaic device 115, such as a solar cell, can be included to recharge the battery 114. In one embodiment, the photovoltaic device 115 can be disposed along the temple portion 106 of the stems 102,103. In this illustrative embodiment, two solar cells are disposed in the temple portion 106 of each stem 102,103, respectively.

Other components 116 can be optionally included in the augmented reality companion device 100 as well. For example, in one embodiment one or more microphones can be included as audio capture devices 117. These audio capture devices can be operable with the one or more processors 111 to receive voice input. Additionally, in one or more embodiments the audio capture devices 117 can capture ambient audio noise. Signals corresponding to captured audio can be transmitted to an electronic device in communication with the augmented reality companion device 100 or a server or cloud-computing device. The other component 116 can additionally include loudspeakers for delivering audio content to a user wearing the augmented reality companion device 110.

The other components 116 can also include a motion generation device for providing haptic notifications or vibration notifications to a user. For example, a piezoelectric transducer, rotational motor, or other electromechanical device can be configured to impart a force or vibration upon the temple portion 106 of the stems 102,103, or alternatively along the frame 101. The motion generation device can provide a thump, bump, vibration, or other physical sensation to the user. The one or more processors 111 can be configured to actuate the motion generation device to deliver a tactile or vibration output alone or in combination with other outputs such as audible outputs.

Similarly, in one or more embodiments the eyewear can include a video capture device 118 such as an imager. The imager can be disposed within the frame 101 or stems 102,103. In one or more embodiments, the video capture device 118 can function as a to detect changes in optical intensity, color, light, or shadow in the near vicinity of the augmented reality companion device 100. As with the audio capture device 117, captured video information can be transmitted to an electronic device, a remote server, or cloud-computing device.

Other sensors 119 can be optionally included in the augmented reality companion device 100. One example of such a sensor is a global positioning system device for determining where the augmented reality companion device 100 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

The other sensors 119 can also include an optional user interface. The user interface can be used, for example, to activate the circuit components or turn them OFF, control sensitivity of the other sensors 119, and so forth. The user interface, where included, can be operable with the one or more processors 111 to deliver information to, and receive information from, a user. The user interface can include a rocker switch, slider pad, button, touch-sensitive surface, or other controls, and optionally a voice command interface. These various components can be integrated together.

In one or more embodiments, an audio output device 120, such as a loudspeaker or other transducer, can deliver audio output to a user. For example, piezoelectric transducers can be operably disposed within the stems 102,103. Actuation of the piezoelectric transducers can cause the stems 102,103 to vibrate, thereby emitting acoustic output. More traditional audio output devices 120, such as loudspeakers, can be used as well.

The other components 116 can optionally include a haptic device providing haptic feedback to a user. The haptic device can include a motion generation device to deliver a tactile response to the user. For example, a piezoelectric transducer or other electromechanical device can be included in the stems 102,103. The transducer can actuate to impart a force upon the user's head to provide a thump, bump, vibration, or other physical sensation to the user. The inclusion of both the audio output device 120 and the haptic device allows both audible and tactile feedback to be delivered.

In one or more embodiments, the augmented reality companion device 100 includes an augmented reality image presentation device 121 operable to deliver augmented reality imagery to a user. The augmented reality image presentation device 121 can be operable with a projector 122. In the illustrative embodiment of FIG. 1, the frame 101 supports the projector 122. In one or more embodiments the projector 122 is configured to deliver images to a holographic optical element when the augmented reality companion device 100 is operating in an augmented reality mode of operation.

In one embodiment, the projector 122 is a modulated light projector operable to project modulated light images along a surface or holographic optical element. In another embodiment, the projector 122 is a thin micro projector. In another embodiment, the projector 122 can comprise a laser projector display module. Other types of projectors will be obvious to those of ordinary skill in the art having the benefit of this disclosure.

In one or more embodiments, the projector 122 can include a lens and a spatial light modulator configured to manipulate light to produce images. The projector 122 can include a light source, such as a single white light emitting diode, multiple separate color light emitting diodes, or multiple separate color laser diodes that deliver visible light to the spatial light modulator through a color combiner. The augmented reality image presentation device 121 can drive the spatial light modulator to modulate the light to produce images. The spatial light modulator can be optically coupled (e.g., by free space propagation) to the lens and/or a beam steerer. Where used, a beam steerer serves to steer a spatially modulated light beam emanating from the spatial light modulator through the lens to create images.

In one or more embodiments, the augmented reality companion device 100 includes a companion device display integration manager 124. When another device transmits event notifications, subtitles, or other contextual information to the augmented reality companion device 100, the companion device display integration manager delivers that information to the augmented reality image presentation device 121 for presentation to the user as an augmented reality experience via the projector 122. Illustrating by example, when another electronic device in communication with the augmented reality companion device 100 redirected an event notification intended for presentation on a companion device serving as a primary display for the electronic device to the augmented reality companion device 100 while the electronic device detects multiple persons within its environment, the companion device display integration manager 124 delivers those event notifications to the augmented reality image presentation device 121 for presentation as an augmented reality experience to the user via the projector 122. Similarly, when another electronic device delivers subtitles associated with a content offering in accordance with a language preference of a user wearing the augmented reality companion device 100, the companion device display integration manager 124 delivers those event notifications to the augmented reality image presentation device 121 for presentation as an augmented reality experience to the user via the projector 122. This will be illustrated in more detail below with reference to FIGS. 4, 5, and 8.

Figure 2:
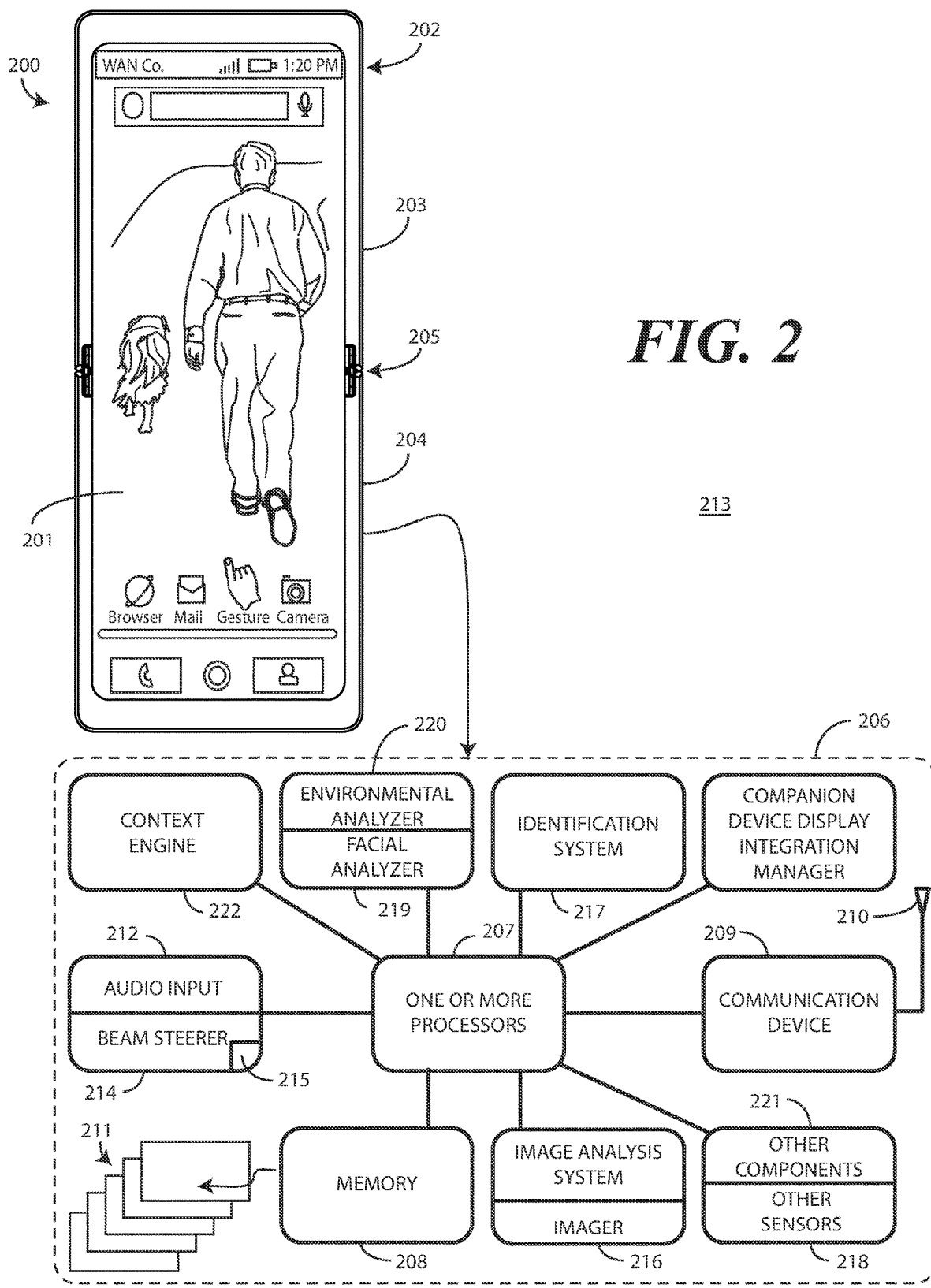
FIG. 2 illustrates one explanatory electronic device in accordance with one or more embodiments of the disclosure.

The augmented reality companion device 100 of FIG. 1 can operate as a stand-alone electronic device in one or more embodiments. However, in other embodiments, the augmented reality companion device 100 can operate in tandem with an electronic device, via wireless electronic communication using the wireless communication device 113 or via a wired connection channel 123 to form an augmented reality system. Turning now to FIG. 2, illustrated therein is one such electronic device 200.

The electronic device 200 of FIG. 2 is a portable electronic device, and is shown as a smartphone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, a media player, or other device.

This illustrative electronic device 200 includes a display 201, which may optionally be touch-sensitive. Users can deliver user input to the display 201, which serves as a user interface for the electronic device 200. In one embodiment, users can deliver user input to the display 201 of such an embodiment by delivering touch input from a finger, stylus, or other objects disposed proximately with the display 201. In one embodiment, the display 201 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position. In other embodiments, the device housing 202 will be rigid and will include no hinge. In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by conductors or a bus disposed along one or more printed circuit boards.

The illustrative block diagram schematic 206 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one embodiment, the electronic device includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

In one or more embodiments, the block diagram schematic 206 includes an audio input/processor 212. The audio input/processor 212 is operable to receive audio input from an environment 213 about the electronic device 200. The audio input/processor 212 can include hardware, executable code, and speech monitor executable code in one embodiment. The audio input/processor 212 can be operable with one or more predefined identification references stored in memory 208. With reference to audio input, the predefined identification references can comprise representations of basic speech models, representations of trained speech models, or other representations of predefined audio sequences that are used by the audio input/processor 212 to receive and identify voice commands that are received with audio input captured by an audio capture device. In one embodiment, the audio input/processor 212 can include a voice recognition engine. Regardless of the specific implementation utilized in the various embodiments, the audio input/processor 212 can access various speech models stored with the predefined identification references to identify speech commands, languages being spoken, and other information.

The audio input/processor 212 can include a beam steering engine 214 comprising one or more microphones 215. Input from the one or more microphones 215 can be processed in the beam steering engine 214 such that the one or more microphones define a virtual microphone. This virtual microphone can define an acoustic reception cone that can be virtually "steered" around the electronic device 200. Alternatively, actual steering can occur as well, such as switching between a left and right microphone or a front and back microphone, or switching various microphones ON and OFF individually. In one or more embodiments, two or more microphones 215 can be included for selective beam steering by the beam steering engine 214.

Illustrating by example, a first microphone can be located on a first side of the electronic device 200 for receiving audio input from a first direction, while a second microphone can be placed on a second side of the electronic device 200 for receiving audio input from a second direction. These microphones can be "steered" by selectively turning them ON and OFF.

The beam steering engine 214 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an imager 216 can estimate a location of a person's face and deliver signals to the beam steering engine 214 alerting it in which direction to focus the acoustic reception cone and/or steer the first microphone and the second microphone, thereby adding confirmation to audio steering and saving time. Where multiple people are around the electronic device 200, this steering advantageously directs a beam reception cone toward a particular person so that languages spoken, language preferences, and other information about the person's speech can be ascertained.

Alternatively, the beam steering engine 214 processes and combines the signals from two or more microphones to perform beam steering. The one or more microphones 215 can be used for voice commands and/or for language recognition. In response to control of the one or more microphones 215 by the beam steering engine 214, a user location direction can be determined. The beam steering engine 214 can then select between the first microphone and the second microphone to beam steer audio reception toward the user. Alternatively, the audio input/processor 212 can employ a weighted combination of the microphones to beam steer audio reception toward the user.

In one embodiment, the audio input/processor 212 is configured to implement a voice control feature that allows a user to speak to cause the one or more processors 207 to identify a language preference corresponding to a particular person. For example, the user may say, "No me gusta." This statement, which is in Spanish, allows the one or more processors 207 to cooperate with an identification system 217 to identify both the language and who is the source of the statement within the environment 213 of the electronic device 200. Consequently, this statement can cause the one or more processors 207 to access the identification system 217 and begin an identification process to determine which person within the environment 213 has Spanish as their language preference. In one or more embodiments, the audio input/processor 212 listens for voice commands, processes the commands and, in conjunction with the one or more processors 207, determines language preferences of persons situated within the environment 213 of the electronic device 200.

The one or more processors 207 can perform filtering operations on audio input received by the audio input/processor 212. For example, in one embodiment the one or more processors 207 can filter the audio input into identifiable audio input, i.e., first audio input, and other audio input that is not identifiable, i.e., second audio input.

Various sensors 218 can be operable with the one or more processors 207. One example of a sensor that can be included with the various sensors 218 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 218 is a geo-locator that serves as a location detector. In one embodiment, location detector is able to determine location data when authenticating a user. Location can be determined by capturing the location data from a constellation of one or more earth orbiting satellites, or from a network of terrestrial base stations to determine an approximate location. The location detector may also be able to determine location by locating or triangulating terrestrial base stations of a traditional cellular network, or from other local area networks, such as Wi-Fi networks.

Another example of a sensor that can be included with the various sensors 218 is an orientation detector operable to determine an orientation and/or movement of the electronic device 200 in three-dimensional space. Illustrating by example, the orientation detector can include an accelerometer, gyroscopes, or other device to detect device orientation and/or motion of the electronic device 200. Using an accelerometer as an example, an accelerometer can be included to detect motion of the electronic device. Additionally, the accelerometer can be used to sense some of the gestures of the user, such as one talking with their hands, running, or walking.

The orientation detector can determine the spatial orientation of an electronic device 200 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 200.

The identification system 217 is operable with the one or more processors 207. A first identifier of the identification system 217 can include an imager 216. In one embodiment, the imager 216 comprises a two-dimensional imager configured to receive at least one image of a person within an environment of the electronic device 200. In one embodiment, the imager 216 comprises a two-dimensional RGB imager. In another embodiment, the imager 216 comprises an infrared imager. Other types of imagers suitable for use as the imager 216 of the identification system 217 will be obvious to those of ordinary skill in the art having the benefit of this disclosure.

The identification system 217 can be operable with a face analyzer 219 and an environmental analyzer 220. The face analyzer 219 and/or environmental analyzer 220 can be configured to process an image or depth scan of an object and determine whether the object matches predetermined criteria by comparing the image or depth scan to one or more predefined identification references stored in memory 208.

For example, the face analyzer 219 and/or environmental analyzer 220 can operate as an identification module configured with optical and/or spatial recognition to identify objects using image recognition, character recognition, visual recognition, facial recognition, color recognition, shape recognition, and the like. Advantageously, the face analyzer 219 and/or environmental analyzer 220, operating in tandem with the identification system 217, can be used as a facial recognition device to determine the identity of one or more persons detected within the environment 213 of the electronic device 200.

In one embodiment when the identification system 217 detects a person, the imager 216 can capture a photograph of that person. The identification system 217 can then compare the image to one or more predefined identification references stored in the memory 208. This comparison, in one or more embodiments, is used to confirm beyond a threshold authenticity probability that the person's face in the image sufficiently matches one or more of the predefined identification references stored in the memory 208 to identify the person and, in some situations, determine who is an authorized user of the electronic device 200 and/or who is the owner of the electronic device 200. Beneficially, this optical recognition performed by the identification system 217 operating in conjunction with the face analyzer 219 and/or environmental analyzer 220 the electronic device 200 to determine who is within the environment 213 of the electronic device 200, as well as who is using a augmented reality companion device (100).

In one or more embodiments, a user can "train" the electronic device 200 by storing predefined identification references in the memory 208 of the electronic device 200. Illustrating by example, a user may take a series of pictures. They can include identifiers of special features such as eye color, sink color, air color, weight, and height. They can include the user standing in front of a particular wall, which is identifiable by the environmental analyzer from images captured by the imager 216. They can include the user raising a hand, touching hair, or looking in one direction, such as in a profile view. These can then be stored as predefined identification references in the memory 208 of the electronic device 200.

The face analyzer 219 can include an image/gaze detection-processing engine as well. The image/gaze detection-processing engine can process information to detect a user's gaze point. Electronic signals can then be delivered from the imager 216 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 221 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 221 can also include proximity sensors. The proximity sensors fall in to one of two camps: active proximity sensors and "passive" proximity sensors. Either the proximity detector components or the proximity sensor components can be generally used for gesture control and other user interface protocols.

The other components 221 can optionally include a barometer operable to sense changes in air pressure due to elevation changes or differing pressures of the electronic device 200. The other components 221 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

A context engine 222 can then operable with the various sensors to detect, infer, capture, and otherwise determine persons and actions that are occurring in an environment about the electronic device 200. For example, where included one embodiment of the context engine 222 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 222 in detecting multi-modal social cues, emotional states, moods, and other contextual information. The context engine 222 can comprise an artificial neural network or other similar technology in one or more embodiments.

In one or more embodiments, the context engine 222 is operable with the one or more processors 207. In some embodiments, the one or more processors 207 can control the context engine 222. In other embodiments, the context engine 222 can operate independently, delivering information gleaned from detecting multi-modal social cues, emotional states, moods, and other contextual information to the one or more processors 207. The context engine 222 can receive data from the various sensors. In one or more embodiments, the one or more processors 207 are configured to perform the operations of the context engine 222.

In one or more embodiments, the one or more processors 207 can be operable with the various authenticators of the identification system 217. For example, the one or more processors 207 can be operable with a first authenticator and a second authenticator. Where more authenticators are included in the identification system 217, the one or more processors 207 can be operable with these authenticators as well.

It is to be understood that in both FIG. 1 and FIG. 2, the elements illustrated are provided for illustrative purposes only in accordance with embodiments of the disclosure. Neither is intended to be a complete schematic diagram of the various components required. Therefore, other electronic devices in accordance with embodiments of the disclosure may include various other components obvious to those of ordinary skill in the art having the benefit of this disclosure, but not shown in FIG. 1 or FIG. 2, or may include a combination of two or more components or a division of a particular component into two or more separate components, and still be within the scope of the present disclosure.

Figure 3:
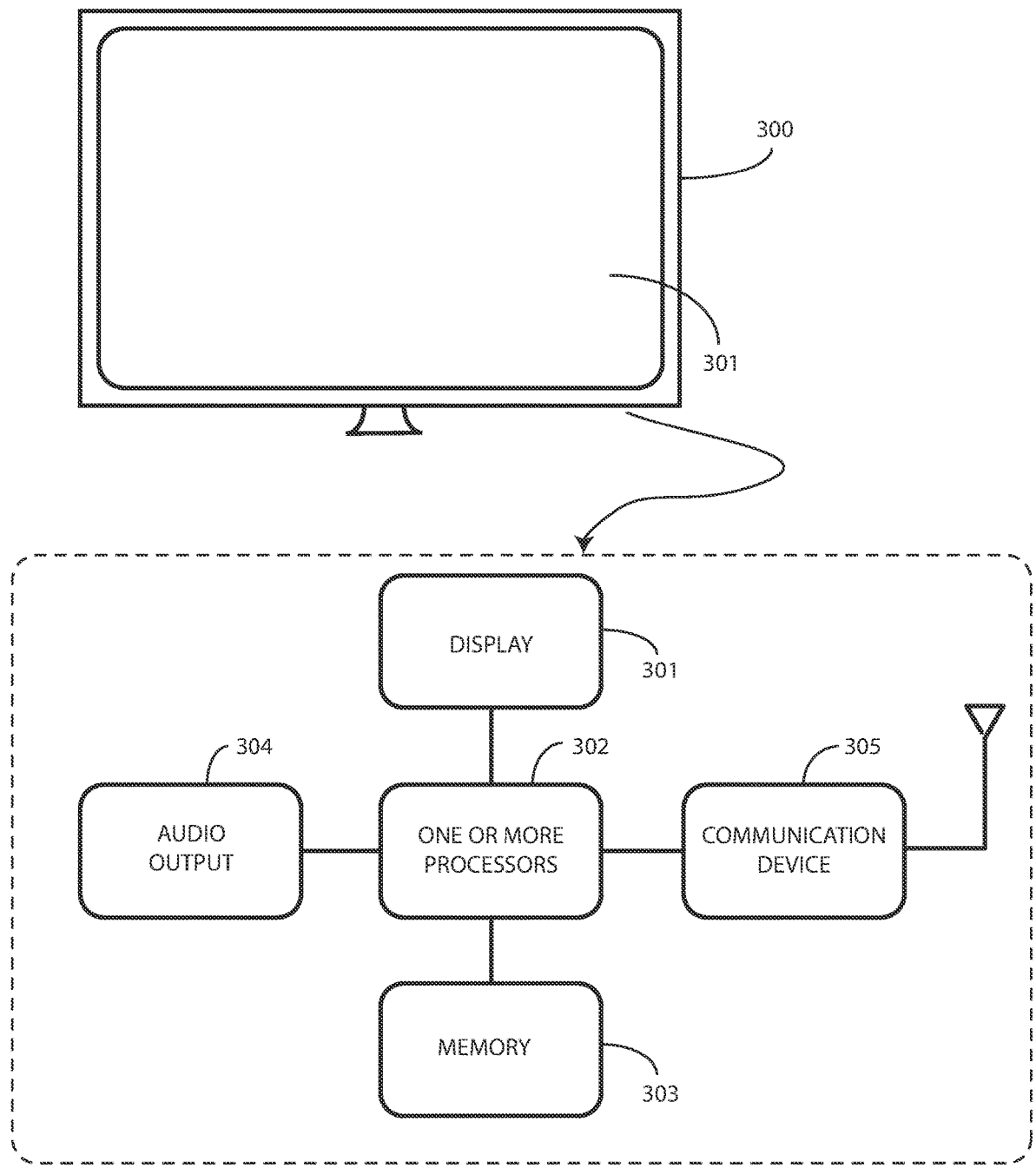
FIG. 3 illustrates one explanatory content presentation companion device in accordance with one or more embodiments of the disclosure.

Turning now to FIG. 3, illustrated therein is one explanatory content presentation companion device 300 in accordance with one or more embodiments of the disclosure. In this illustrative embodiment, the content presentation companion device 300 comprises a color video monitor. In other embodiments, the content presentation companion device 300 can take other forms. Illustrating by example, the content presentation companion device 300 can be a television, a computer display, a laptop display, a tablet computer, or a projector projecting content onto a screen. Other examples of content presentation companion devices 300 will be obvious to those of ordinary skill in the art having the benefit of this disclosure. Regardless of configuration, in one or more embodiments the content presentation companion device 300 includes one or more processors 302, a display 301, a memory 303, an audio output 304, and a communication device 305 capable of wired or wireless communication with an electronic device such as the electronic device (200) of FIG. 2.

In one or more embodiments, when coupled by either a wireless or wired connection to such an electronic device (200), the content presentation companion device 300 can function as a primary display for the electronic device (200). The electronic device (200) can receive content from a terrestrial broadcast network, cable television network, Internet streaming service, or combinations thereof, and redirect this content to the content presentation companion device 300 since its display 301 is larger than the display (201) of the electronic device (200). This allows people within the environment of the electronic device (200) or content presentation companion device 300 to more easily see the content. In one or more embodiments, content flows from the electronic device (200) to the content presentation companion device 300 through the communication device 305.

As will be described in more detail below with reference to the subsequent methods and method steps, the presentation of event notifications, subtitles, or other information to a user wearing an augmented reality companion device (100) occurs as a function of one or more personal characteristics corresponding to one or more persons being physically situated within a predefined environment (213) of the electronic device (200) and or the content presentation companion device 300. These personal characteristics can include characteristics such as whether a person is using an augmented reality companion device (100), what language the persons within the predefined environment (213) speak, and so forth. Other examples of personal characteristics will be described below. Still others will be obvious to those of ordinary skill in the art having the benefit of this disclosure.

Figure 4:
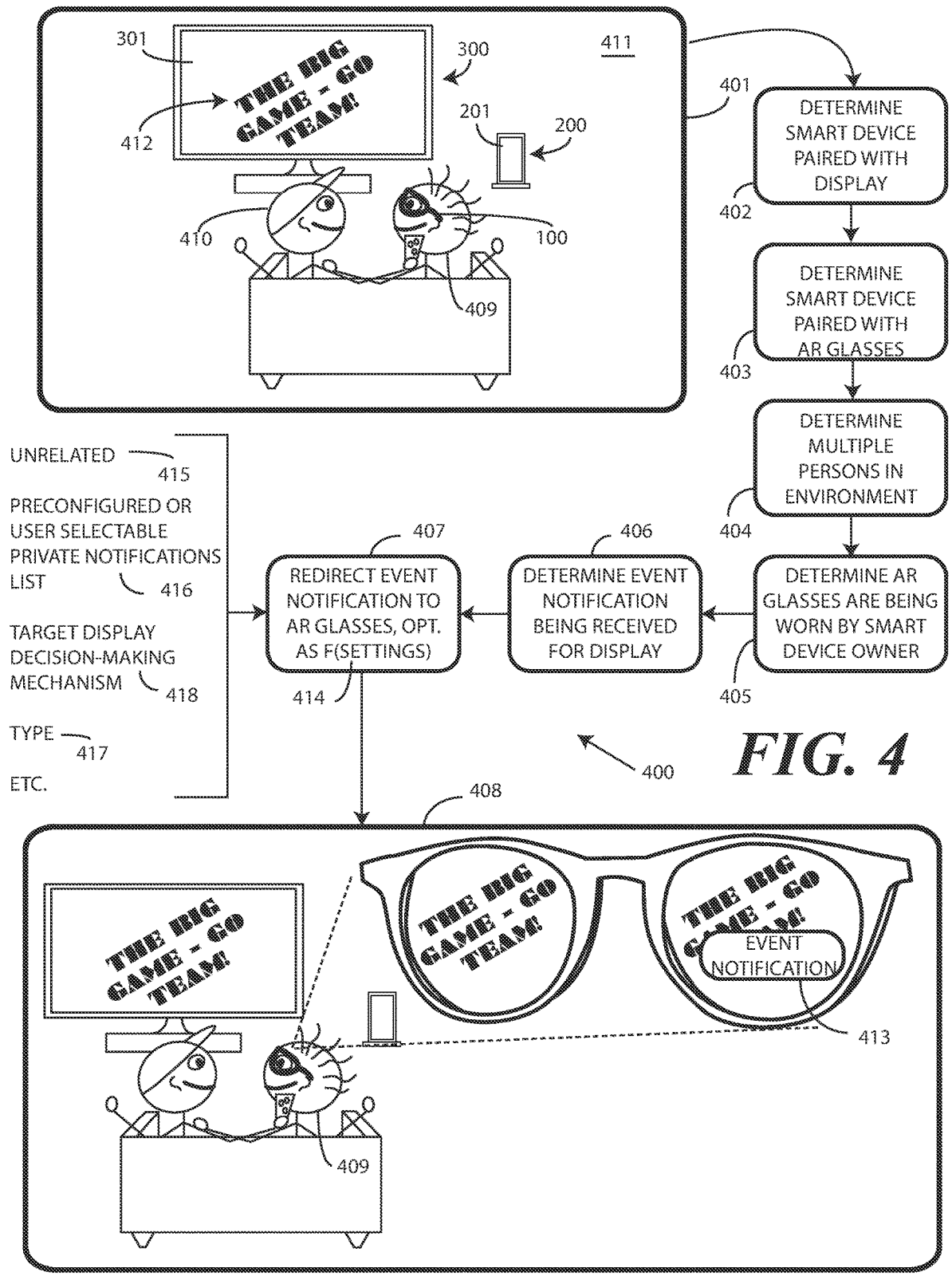
FIG. 4 illustrates one or more explanatory method steps in accordance with one or more embodiments of the disclosure.

Turning now to FIG. 4, illustrated therein is one explanatory method 400 illustrating how the augmented reality companion device 100 of FIG. 1, the electronic device 200 of FIG. 2, and the content presentation companion device 300 can be used as a system. Beginning at step 401, the electronic device 200 is streaming a content offering 412, which in this illustrative example is the big game. Said differently, at step 401 the one or more processors (207) of the electronic device 200 are causing the communication device (209) of the electronic device to deliver the content offering 412 to the content presentation companion device 300 for presentation to the environment 411.

A first person 409 and a second person 410 are situated within an environment 411 of the electronic device 200. Since both the first person 409 and the second person 410 want to watch the big game, the first person 409, who is the owner of the electronic device 200 in this example, causes the big game to be delivered from the electronic device 200 to the content presentation companion device 300 since its display 301 is much larger than the display 201 of the electronic device 200. When in this content delivery mode of operation, the content presentation companion device 300 serves as the primary display for the electronic device 200.

This enables both the first person 409 and the second person 410 to easily see the big game.

In this illustration, the first person 409 is also wearing an augmented reality companion device 100. At step 402, one or more processors (207) of the electronic device 200 detect, using a communication device (209) of the electronic device 200, that the electronic device is electronically in communication with the content presentation companion device 300 while the content presentation companion device 300 is operating as the primary display for the electronic device 200. At step 403, the one or more processors (207) of the electronic device 200 detect, again using the communication device (209) of the electronic device 200, that the electronic device is electronically in communication with the augmented reality companion device 100.

At step 404, the one or more processors (207) of the electronic device 200, operating in tandem with one or more sensors (218) of the electronic device 200, detect that multiple persons, here the first person 409 and the second person 410, are present within the environment 411 of the electronic device 200 while the content presentation companion device 300 is operating as the primary display for the electronic device 200.

At optional step 405, the one or more processors (207) of the electronic device 200 can identify, using an identification system (217) or other components of the electronic device 200, whether one person of the multiple persons situated within the environment 411 of the electronic device 200 is an authorized user of the electronic device 200. Here, the first person 409 is the owner of the electronic device 200, and has authenticated himself to the electronic device 200 as such by entering a password. Accordingly, the first person 409 constitutes an authorized user of the electronic device 200.

In one or more embodiments, step 405 also comprises detecting, using the one or more sensors (218), the imager 216, the identification system (217), or other components of the electronic device 200, that the authorized user of the electronic device 200, here the first person 409, is operating the augmented reality companion device 100. As shown at step 401, in this illustrative example the authorized user is indeed operating the augmented reality companion device 100.

At step 406, the one or more processors (207) of the electronic device 200 determine that an event notification is being generated or received for display. The event notification, which can include a notification that an incoming call was received, an incoming email message was received, an incoming text message was received, an alarm has occurred, a social media post has been posted, a news event has been received, a calendar event has occurred, one or more subtitles associated with a content offering, an application generated event notification, an incoming electronic communication event notification, or other information, can take various forms. In one or more embodiments, the event notification is configured graphically as images, words, shapes, or other objects, indicate that one or more notifications have been received by the electronic device 200. For example, if the electronic device 200 includes an Internet browser application, an electronic mail application, a social media application, and a news application operating on the one or more processors (207), the event notification can provide a brief indication to the user that an event has occurred in one of these applications.

Illustrating by example, when new electronic mail correspondence is received, the electronic mail application may generate an event notification to indicate that a person has unread electronic mail. Similarly, when a friend posts new content, the social media application may cause an event notification to be generated for presentation to the user, and so forth. These examples are illustrative only, as numerous other event notifications and corresponding applications will be obvious to those of ordinary skill in the art having the benefit of this disclosure.

Since the first person 409 and the second person 410 are both enjoying the big game while the content presentation companion device 300 serves as the primary display of the electronic device 200, presenting the event notification on the display 301 of the content presentation companion device 300 may irritate or distract the second person 410 due to the fact that the event notification is intended only for an owner or authorized user of the electronic device 200. Since the second person 410 is not the intended recipient of the event notification, presenting the event notification on the display 301 of the content presentation companion device 300 will only be a distraction.

Accordingly, in one or more embodiments step 407 comprises the one or more processors (207) of the electronic device 200 redirecting the event notification intended for presentation on the primary display of the electronic device 200 to the augmented reality companion device 100. Step 407 can optionally include redirecting audio content to loudspeakers included with the augmented reality companion device 100 as well. Advantageously, this allows the first person 409 to easily see the event notification 413 as an augmented reality object as shown at step 408 and/or hear audio content at the same time. This allows the first person 409 to continue watching the content offering 412, yet still remain informed regarding event notifications being directed to the electronic device 200 without disturbing the second person's enjoyment of the content offering 412.

In one or more embodiments, the redirecting occurring at step 407 occurs as a function 414 of one or more inputs. Illustrating by example, in one or more embodiments the redirecting of step 407 occurs while the communication device (209) of the electronic device 200 delivers the content offering 412 to the content presentation companion device 300. If, for example, the first person 409 and the second person 410 pause the delivery of the content offering 412 from being delivered to the content presentation companion device 300 to take a restroom break, event notifications can be presented on the display 201 of the electronic device 200 in the interim. In one or more embodiments, the redirecting occurring at step 407 occurs only while the communication device (209) of the electronic device 200 delivers the content offering 412 to the content presentation companion device 300.

In one or more embodiments, the one or more processors (207) of the electronic device 200 determine whether the event notification 413 is unrelated 415 to the content offering 412. In one or more embodiments, the redirecting of step 407 occurs only when the event notification 413 is unrelated 415 to the content offering 412. Illustrating by example, if the event notification 413 is a score update, or player injury update, or is otherwise related to the big game, such an event notification 413 would likely be of interest to both the first person 409 and the second person 410. Accordingly, in one or more embodiments the one or more processors (207) of the electronic device 200 will omit the redirection of step 407 when the event notification 413 is related to the content offering 412 and instead present the event notification 413 on the primary display of the electronic device 200, which is the display 301 of the content presentation companion device 300 in this example. By contrast, if the event notification 413 is unrelated to the content offering 412, such as would be the case when the first person 409 and the second person 410 are watching the big game and the event notification 413 is related to a work issue the first person's employer is experiencing, the one or more processors (207) of the electronic device 200 will redirect, at step 407, the event notification 413 to the augmented reality companion device 100.

As noted above, at step 405 the one or more processors (207) of the electronic device 200 can determine whether an authorized user is situated within the environment 411 of the electronic device 200. In one or more embodiments, the redirecting of step 407 occurs only when the authorized user is situated within the environment 411.

As also noted above, step 405 can further include determining whether the authorized user of the electronic device 200 is operating the augmented reality companion device 100. In one or more embodiments, the redirecting of step 407 occurs only when the authorized user is operating the augmented reality companion device 100.

In one or more embodiments, step 406 can comprise the one or more processors (207) of the electronic device 200 determining who is the intended recipient of the event notification 413. In one or more embodiments, the redirecting of step 407 occurs only when the authorized user is the intended recipient of the event notification 413. Illustrating by example, if the first person's employer needs to contact the first person 409 for an issue occurring at work, this notification would not be intended for the second person 410. Instead, the only person situated within the environment 411 of the electronic device 200 for whom the event notification 413 was intended would be the first person 409. Accordingly, this event notification 413 would be redirected, at step 407, to the augmented reality companion device 100. By contrast, if the first person 409 and the second person 410 are twin brothers, and someone wishes them a happy birthday, the redirecting of step 407 can be omitted and the event notification 413 can be presented on the primary display of the electronic device 200, which is the display 301 of the content presentation companion device 300 in this illustrative example.

In one or more embodiments, the redirecting of step 407 can occur in accordance with a preconfigured or user selectable private notifications list 416. The preconfigured or user selectable private notifications list 416 can include a list of notification types 417 that are to be redirected to the augmented reality companion device 100. Examples of such types 417 included within the list could be new message notices, incoming call notices, notifications from specific applications, and so forth. Other types of event notifications will be obvious to those of ordinary skill in the art having the benefit of this disclosure. Accordingly, in one or more embodiments at step 406 the one or more processors (207) of the electronic device determine an event notification type 417 associated with the event notification 413, with the redirecting of step 407 occurring only when the event notification type 417 is within a predefined event notification type class included within the preconfigured or user selectable private notifications list 416. If not included in the list, redirection of the event notification 413 occurring at step 407 can be omitted, with the event notification 413 being presented on the primary display instead.

In one or more embodiments, the redirecting of step 407 can occur as a function of a target display decision-making mechanism 418 based upon a private notifications list. If, for example, an event notification 413 contains private or personal information corresponding to the private notifications list, the event notification 413 can be redirected at step 407 to the augmented reality companion device 100. By contrast, if no personal information is included, as determined by the target display decision-making mechanism 418 redirection of the event notification 413 occurring at step 407 can be omitted, with the event notification 413 being presented on the primary display instead. This would prevent, for example, the second person 410 from seeing an event notification 413 indicating that the girlfriend of the first person 409 is breaking up with him, while allowing other event notifications such as messages from friends cheering on one of the teams of the big game.

Accordingly, as illustrated in FIG. 4, the electronic device 200 includes a communication device (209) electronically communicating with a content presentation companion device 300 operating as a primary display for the electronic device 200. The communication device (209) is also electronically communicating with an augmented reality companion device 100 being worn by an owner of the electronic device 200, which in this example is the first person 409.

One or more sensors (218), an identification system (217), an imager (216), or other components of the electronic device 200 detect multiple persons being situated within an environment 411 of the electronic device 200 while the content presentation companion device 300 operates as the primary display of the electronic device 200. One or more processors (207) of the electronic device 200 then redirect an event notification 413 intended for presentation on the primary display to the augmented reality companion device 100 when both the content presentation companion device 300 operates as the primary display for the electronic device 200 and the multiple persons are within the environment 411 of the electronic device 200.

As explained above, this delivery of the event notification 413 to the augmented reality companion device 100 can be conditional. Illustrating by example, in one or more embodiments the one or more processors (207) redirect the event notification 413 to the augmented reality companion device 100 only when the one or more sensors (218) or other components of the electronic device 200 detect the owner of the electronic device 200 being among the multiple persons situated within the environment 411 of the electronic device 200.

In other embodiments, the one or more processors (207) redirect the event notification 413 to the augmented reality companion device 100 only when the owner of the electronic device 200 is the only person of the multiple persons situated within the environment 411 who is an intended recipient of the event notification 413. In still other embodiments, one or more processors (207) redirect the event notification 413 to the augmented reality companion device 100 only when the event notification is of a predefined event notification type 417. This predefined event notification type 417 could be defined by a preconfigured or user selectable private notifications list 416, which can be stored in the memory (208) of the electronic device 200.

In one or more embodiments, the one or more processors (207) redirect the event notification 413 from the content presentation companion device 300 to the augmented reality companion device 100 when at least one predefined condition is met. In one or more embodiments, the at least one predefined condition comprises the one or more sensors (218) detecting multiple persons consuming the content offering 412 within the environment 411 of the electronic device 200.

The at least one predefined condition can be multifaceted, however. Illustrating by example, in one or more embodiments the at least one predefined condition further comprises the one or more sensors (218) identifying an owner of the electronic device 200 among the multiple persons situated within the environment 411 of the electronic device 200. Similarly, the at least one predefined condition can further comprise the one or more sensors (218) identifying the owner of the electronic device 200 operating the augmented reality companion device 100. In still other embodiments, the at least one predefined condition can comprise the one or more processors (207) determining that the owner of the electronic device 200 is the only person of the multiple persons situated within the environment 411 of the electronic device 200 to whom the event notification 413 is directed. These are examples only. Other examples of facets of the at least one predefined condition will be obvious to those of ordinary skill in the art having the benefit of this disclosure.

Figure 5:
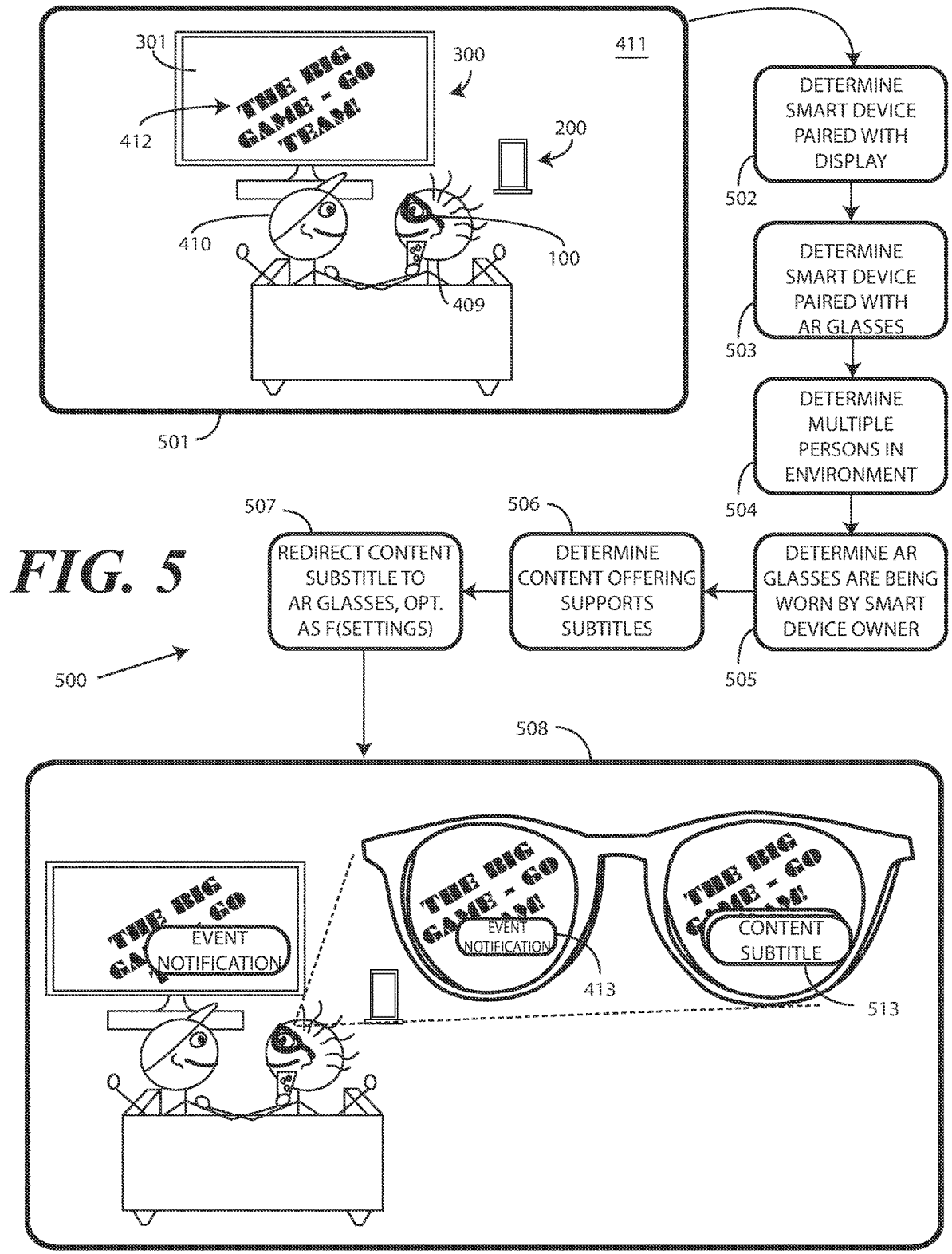
FIG. 5 illustrates one or more embodiments explanatory method steps in accordance with one or more embodiments of the disclosure.

While in many instances the event notification 413 will be an incoming electronic communication event notification, such as would be the case when an email, text message, or voice call was received by the electronic device 200, or an application generated event notification, such as would be the case if an alarm in a calendar application occurs, embodiments of the disclosure are not so limited. Embodiments of the disclosure have a multitude of uses. Illustrating by example, in other embodiments the event notification 413 may be a subtitle associated with the content offering 412. Turning now to FIG. 5, illustrated therein is a method 500 showing how another embodiment of the disclosure can be used with subtitles.

Beginning at step 501, a system is shown that includes an electronic device 200 comprising one or more sensors (218), a communication device (209), and one or more processors (207). A content presentation companion device 300 is electronically in communication with the electronic device 200. Similarly, an augmented reality companion device 100 is also electronically in communication with the electronic device 200.

The one or more processors (207) of the electronic device 200 cause the communication device (209) to deliver a content offering 412 to the content presentation companion device 300 for presentation to the environment 411 of the electronic device 200 at step 501. Accordingly, the display 301 of the content presentation companion device 300 serves as a primary display for the electronic device 200 at step 501.

At step 502, one or more processors (207) of the electronic device 200 detect, using a communication device (209) of the electronic device 200, that the electronic device 200 is electronically in communication with the content presentation companion device 300 while the content presentation companion device 300 is operating as the primary display for the electronic device 200. At step 503, the one or more processors (207) of the electronic device 200 detect, again using the communication device (209) of the electronic device 200, that the electronic device is electronically in communication with the augmented reality companion device 100.

At step 504, the one or more processors (207) of the electronic device 200, operating in tandem with one or more sensors (218) of the electronic device 200, detect that multiple persons, here the first person 409 and the second person 410, are present within the environment 411 of the electronic device 200 while the content presentation companion device 300 is operating as the primary display for the electronic device 200.

At optional step 505, the one or more processors (207) of the electronic device 200 can identify, using an identification system (217) or other components of the electronic device 200, whether one person of the multiple persons situated within the environment 411 of the electronic device 200 is an authorized user or owner of the electronic device 200. Here, the first person 409 is the owner of the electronic device 200. Step 505 can also comprise detecting, using the one or more sensors (218), the imager 216, the identification system (217), or other components of the electronic device 200, that the owner of the electronic device 200 is operating the augmented reality companion device 100.

At step 506, the one or more processors (207) of the electronic device 200 determine that the content offering 412 has subtitles associated therewith. Step 507 then comprises the one or more processors (207) redirecting the subtitles 513 to the augmented reality companion device 100 as shown at step 508. In one or more embodiments, step 507 can occur as a function of one or more device settings. Illustrating by example, in one or more embodiments if there is a need or device setting requesting delivery of an audio track in addition to the subtitles 513, step 507 can optionally include redirecting audio associated with the content offering 412 as well. The subtitles 513 and/or audio can be a function of location as well. If, for example, the first person 409 and the second person 410 are located in Spain, the subtitles 513 and/or audio may be in Spanish. BY contrast, if the first person 409 and the second person 410 are in India, the subtitles 513 and/or audio may be in Hindi, and so forth. The presentation of the subtitles 513 and/or audio can occur in conjunction with the presentation of other event notifications 413, or independently thereof.

Figure 6:
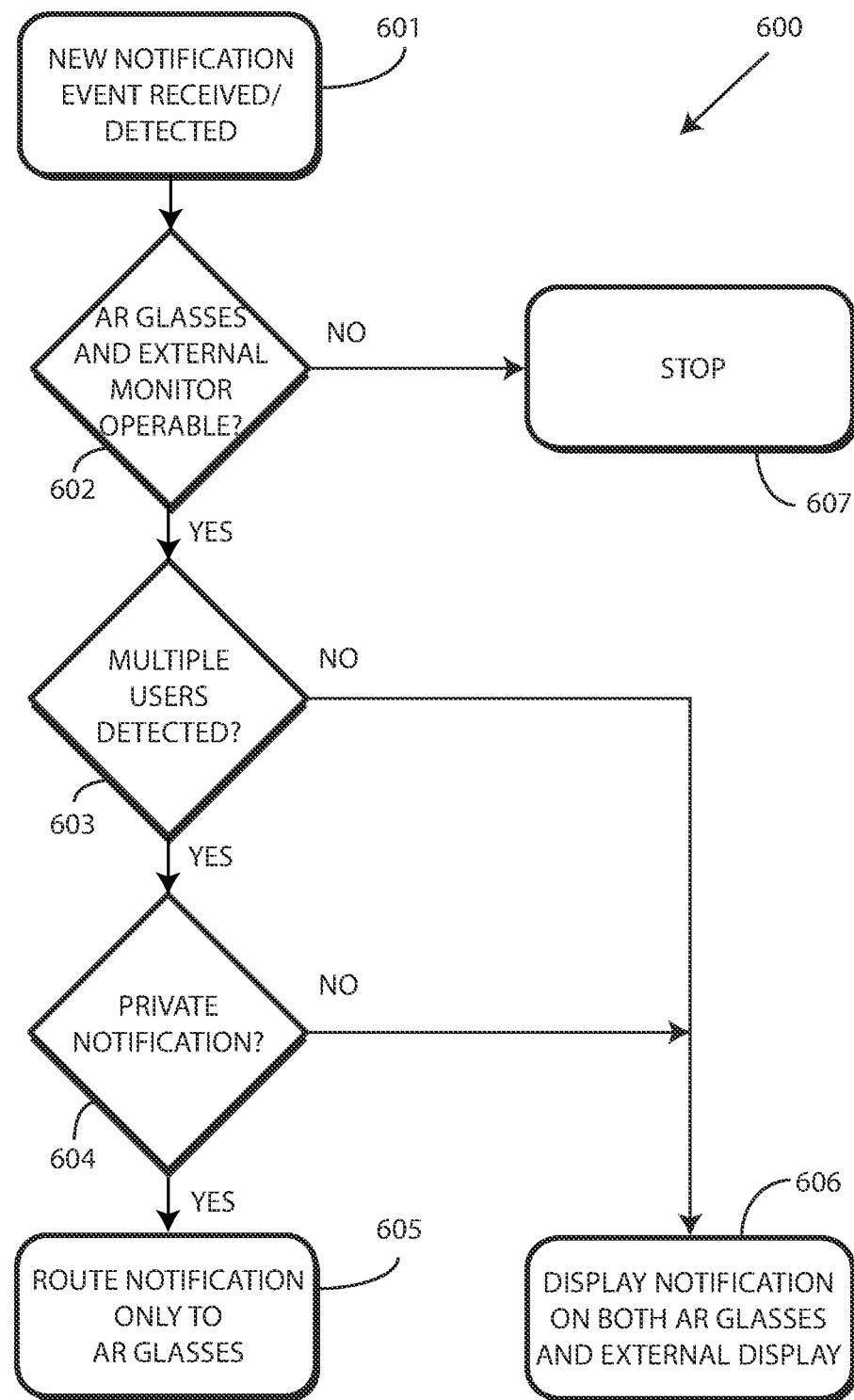
FIG. 6 illustrates one explanatory method in accordance with one or more embodiments of the disclosure.

Turning now to FIG. 6, illustrated therein is another method 600 in accordance with one or more embodiments of the disclosure. Beginning at step 601, an event notification event occurs. In one or more embodiments, step 601 comprises a communication device of an electronic device receiving data causing an event notification to need to be presented. In other embodiments, step 601 comprises an application generating an event notification for presentation. Other reasons for the necessity of presenting event notifications will be obvious to those of ordinary skill in the art having the benefit of this disclosure.

Decision 602 then determines whether the communication device of the electronic device is electronically in communication with both a content presentation companion device and an augmented reality companion device. Where it is, the method 600 moves to decision 603. Otherwise, the method 600 stops to step 607.

Decision 603 then determines whether multiple persons are situated within an environment of the electronic device. Where they are, the method 600 moves to decision 604. Otherwise, the method 600 moves to step 606.

Decision 604 then determines whether the event notification of step 601 is a private notification or a public notification. The event notification may be a private event notification if it the intended recipient of the event notification is only one of the multiple persons detected at decision 603. Alternatively, the event notification may be a private event notification if it contains private information pertaining only to one person of the multiple persons detected at decision 603.

Where the electronic device is electronically in communication with both a content presentation companion device and an augmented reality companion device, there are multiple persons within the environment of the electronic device, and the event notification is a private notification, in one or more embodiments step 605 comprises the electronic device redirecting the event notification from the content presentation companion device to the augmented reality companion device. Step 605 can include directing audio content associated with the content offering to the augmented reality companion device in one or more embodiments. By contrast, when one or more if these predefined conditions fails to occur, in one or more embodiments the electronic device presents the event notification at both the content presentation companion device and the augmented reality companion device at step 606.

Figure 7:
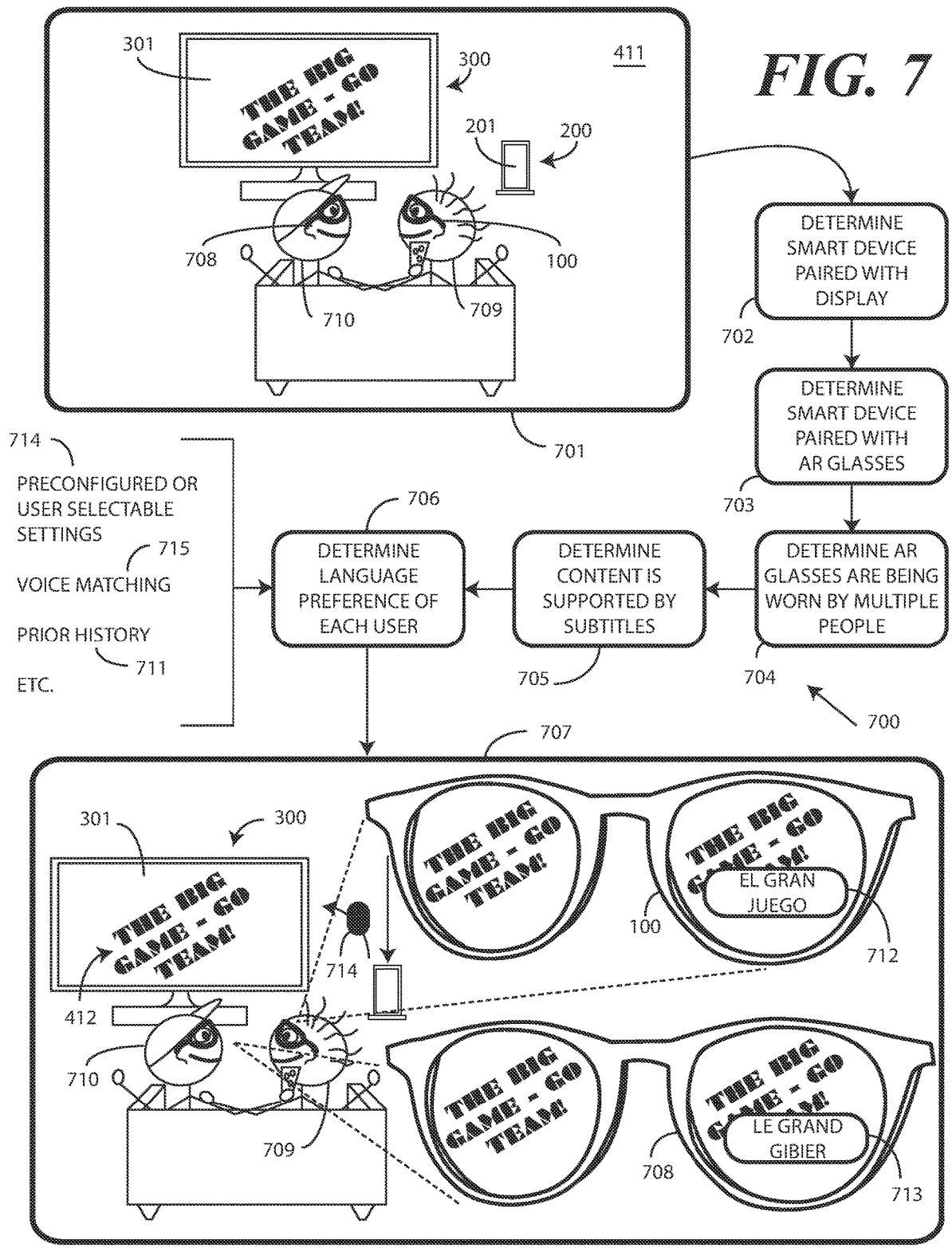
FIG. 7 illustrates one or more explanatory method steps in accordance with one or more embodiments of the disclosure.

Turning now to FIG. 7, illustrated therein is yet another method 700 in accordance with embodiments of the disclosure. The method 700 of FIG. 7 illustrates how embodiments of the disclosure can be used to deliver subtitles in different languages to speakers of different languages while those speakers use augmented reality companion devices while consuming content from a content presentation companion device operating as a primary display for an electronic device.

Beginning at step 701, one or more processors (207) of an electronic device 200 cause a communication device (209) of the electronic device 200 to deliver content offering 412 to a content presentation companion device 300 for presentation to an environment 411 of the electronic device 200. In this illustrative embodiment, a first person 709 and a second person 710 are situated within the environment 411 of the electronic device 200 and are consuming the content offering 412 from the content presentation companion device 300 while the display 301 of the content presentation companion device 300 functions as the primary display of the electronic device 200.

In this illustration, the first person 709 speaks Spanish, while the second person 710 speaks French. However, the content offering 412 is a football game with audio dialogue in English. Fortunately, both the first person 709 and the second person 710 are wearing augmented reality companion devices configured in accordance with embodiments of the disclosure. As will be demonstrated below, this allows each of them to enjoy the content offering 412 in their native language. As alluded to above, the method 700 of FIG. 7 could also be used if the first person 709 and the second person 710 were English speakers but trying to learn Spanish and French, respectively.

At step 702, the one or more processors (207) of the electronic device 200 detect that the communication device (209) of the electronic device 200 is electronically in communication with the content presentation companion device 300. At step 703, the one or more processors (207) of the electronic device 200 detect that the communication device (209) of the electronic device 200 is electronically in communication with both a first augmented reality companion device 100 and a second augmented reality companion device 708.

At step 704, the one or more processors (207), optionally with one or more sensors (218) and/or an identification system (217) as described above with reference to FIG. 2, identify the first person 709 operating the first augmented reality companion device 100 and the second person 710 operating the second augmented reality companion device 708. At step 705, the one or more processors (207) of the electronic device 200 determine whether the content offering 412 supports subtitles. In this example, it does, supporting subtitles in English, French, Spanish, German, Hindi, and Mandarin.

At step 706, the one or more processors (207) of the electronic device 200 determine a first language preference of the first person 709 and a second language preference of the second person 710. This can be done in a variety of ways.

In one or more embodiments, the one or more processors (207) of the electronic device 200 determine a first language preference of the first person 709 and a second language preference of the second person 710 from one or more user settings 714 of the electronic device 200. The owner of the electronic device 200, here the first person 709, may use a menu or other user settings controls to let the one or more processors (207) know that his first language preference is Spanish, while the second language preference of the second person 710 is French. Accordingly, in one or more embodiments the determination of at least one of the first language preference of the first person or the second language preference of the second person occurs by determining a user setting 714 stored within a memory (208) of the electronic device 200.

In another embodiment, voice recognition 715 can be used to determine the first language preference of the first person 709 and the second language preference of the second person 710. As described above with reference to FIG. 2, an audio input/processor (212) can receive audio input from one or more microphones (215) and can determine what language is being spoken by each of the first person 709 and the second person 710.

In still other embodiments, a prior usage history 711 of the first augmented reality companion device 100 and the second augmented reality companion device 708 could be used to determine the first language preference of the first person 709 and the second language preference of the second person 710. Other techniques for determining the first language preference of the first person 709 and the second language preference of the second person 710 will be obvious to those of ordinary skill in the art having the benefit of this disclosure.

At step 707, the one or more processors (207) of the electronic device 200 cause the communication device (209) of the electronic device 200 to deliver first subtitles 712 associated with the content offering 412 in the first language preference to the first augmented reality companion device 100 and second subtitles 713 associated with the content offering in the second language preference to the second augmented reality companion device 708. In one or more embodiments, the one or more processors (207) of the electronic device 200 can additionally cause the communication device (209) of the electronic device 200 to deliver audio content to loudspeakers or in-ear speakers of the first augmented reality companion device 100 and to the second augmented reality companion device 713 as well. Where audio is included, this allows different audio tracks to be delivered to each of the first augmented reality companion device 100 and the second augmented reality companion device 713 depending upon the first language preference and the second language preference, respectively. Alternatively, audio in a third language, e.g., English in this example, can be delivered with the first subtitles 712 and the second subtitles 713. Other configurations will be obvious to those of ordinary skill in the art having the benefit of this disclosure.

If, for example, the content offering 412 had been a movie instead of the big game, the first subtitles 712 and the second subtitles 713 may comprise dialog associated with the movie. In the case of the big game, the first subtitles 712 and the second subtitles 713 may comprise transcriptions of the announcers calling the play-by-play action. Alternatively, when the content offering 412 is a sporting event as is the case in the illustrative example of FIG. 7, the first subtitles 712 and the second subtitles 713 can comprise scores associated with the sporting event. If the content offering 412 had been a music video, the first subtitles 712 and the second subtitles 713 could be lyrics associated with the music video, and so forth. Other examples of subtitles will be obvious to those of ordinary skill in the art having the benefit of this disclosure.

In this illustrative example, the first language preference and the second language preference are different, as the first language preference is Spanish and the second language preference is French.

Since the first language preference and second language preference are different, step 707 also comprises precluding, with the one or more processors (207) of the electronic device 200, the presentation of either the first subtitles 712 or the second subtitles 713 from presentation on the display 301 of the content presentation companion device 300 as shown at step 707. This adds to the enjoyment of the content offering 412 by each person, as the Spanish speaker, here the first person 709, and the French speaker, here the second person 710, are not distracted by subtitles in languages they do not understand. In other embodiments, the one or more processors (207) of the electronic device will deliver the first subtitles 712 and the second subtitles to both the first augmented reality companion device 100 and content presentation companion device 300 and the second augmented reality companion device 708 and the content presentation companion device 300, respectively.

In still other embodiments, such as may be the case when both the first person 709 and the second person 710 are bilingual or hearing impaired, the one or more processors (207) of the electronic device 200 may cause the communication device (209) to deliver third subtitles 714 associated with the content offering 412 to the content presentation companion device 300. In one or more embodiments, the third subtitles 714 are in a third language preference that is different from both the first language preference and the second language preference. Illustrating by example, the third subtitles 714 may be in English.

Accordingly, as shown in FIG. 7 an electronic device 200 includes a communication device (209) electronically delivering a content offering 412 to a content presentation companion device 300 operating as a primary display for the electronic device 200 while the communication device (209) is electronically communicating with at least two augmented reality companion devices 100,708. One or more sensors (218) or other components of the electronic device 200 identify, as described above with reference to FIG. 2, a first person 709 operating a first augmented reality companion device 100 and a second person 710 operating a second augmented reality companion device 708 of the at least two augmented reality companion devices within an environment 411 of the content presentation companion device 300 while the content presentation companion device 300 operates as the primary display for the electronic device 200. In this illustrative embodiment, both the first augmented reality companion device 100 and the second augmented reality companion device 708 comprise augmented reality glasses.

In one or more embodiments, one or more processors (207) of the electronic device 200 cause the communication device (209) to electronically deliver first subtitles 712 associated with the content offering 412 in a first language preference of the first person 709 to the first augmented reality companion device and second subtitles 713 associated with the content offering 412 in a second language preference of the second person 710 to the second augmented reality companion device 708. In the illustrative embodiment of FIG. 7, while the electronic device 200 includes a display 201, the content presentation companion device 300 comprises a monitor having another display 301 that is larger than the display 201 of the electronic device 200. By delivering the content offering 412 to the content presentation companion device 300, the first person 709 and second person 710 can more easily see the content offering 412.

Figure 8:
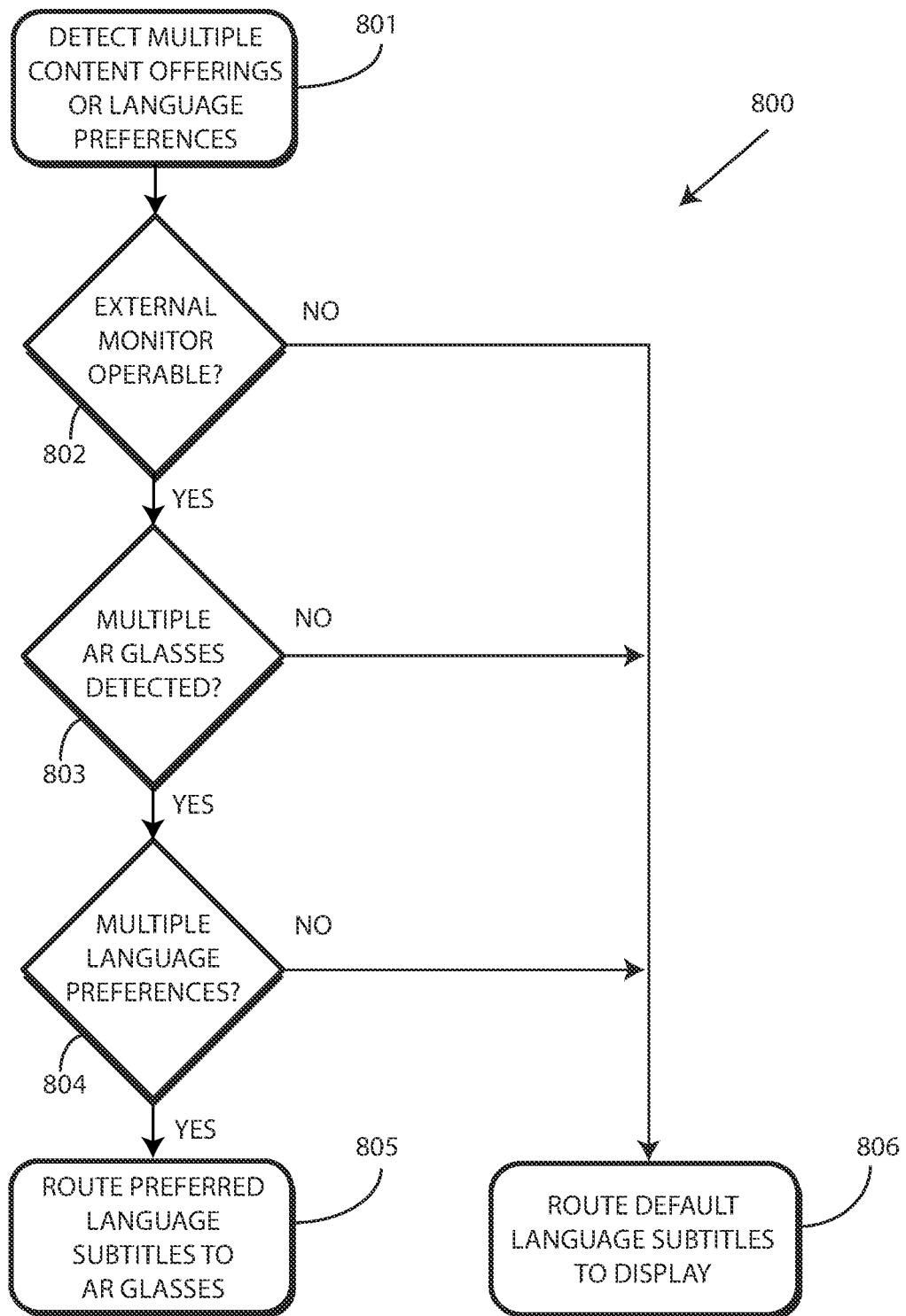
FIG. 8 illustrates another explanatory method in accordance with one or more embodiments of the disclosure

Turning now to FIG. 8, illustrated therein is another method 800 in accordance with one or more embodiments of the disclosure. The method 800 is suitable for a system comprising an electronic device comprising one or more sensor, a communication device, and one or more processors, a content presentation companion device electronically in communication with the electronic device an presenting a content offering, and at least two augmented reality companion devices in communication with the electronic device. The method results in the one or more processors causing the communication device to electronically deliver first subtitles associated with the content offering in a first language preference to the first augmented reality companion device of the at least two augmented reality companion devices, and second subtitles associated with the content offering in a second language preference to a second augmented reality companion device of the at least two augmented reality companion devices. In one or more embodiments, the first language preference and the second language preference are different.

Beginning at step 801, the method 800 determines the first language preference and the second language preference. In one or more embodiments, this step comprises one or more sensors of the electronic device comprising an audio input receiving voice utterances from persons within the environment of the electronic device, with the one or more processors further determining the first language preference and the second language preference using voice recognition to identify the first language preference and the second language preference from audio received by the audio input while the first person operates the first augmented reality companion device and the second person operates the second augmented reality companion device. In other embodiments, this step 801 comprises retrieving the first language preference and the second language preference from a memory of the electronic device storing the same. Other techniques for performing step 801 will be obvious to those of ordinary skill in the art having the benefit of this disclosure.

Decision 802 determines that the electronic device is in communication with, and delivering the content offering to, the content presentation companion device. Where it is, the method moves to decision 803. Otherwise, the method 800 moves to step 806.

Decision 803 determines that the electronic device is in communication with at least two augmented reality companion devices. Where it is, the method moves to decision 804. Otherwise, the method 800 moves to step 806.

Decision 804 determines whether the first language preference and the second language preference are different. Where it is, the method moves to decision 804. Otherwise, the method 800 moves to step 806.

At step 805, the one or more processors of the electronic device cause the communication device to electronically deliver first subtitles associated with the content offering in a first language preference to the a first augmented reality companion device of the at least two augmented reality companion devices and second subtitles associated with the content offering in a second language preference to a second augmented reality companion device of the at least two augmented reality companion devices. In one or more embodiments, step 805 further comprises the one or more processors causing the communication device to deliver third subtitles in a third language preference to the content presentation companion device, where the third language preference is different from both the first language preference or the second language preference. Step 805 can further comprise the one or more processors of the electronic device precluding the presentation of subtitles at the content presentation companion device. In one or more embodiments, step 805 comprises the one or more processors causing the communication device to electronically deliver the first subtitles to the first augmented reality companion device and the second subtitles to the second augmented reality companion device only when the one or more sensors identify a first person operating the first augmented reality companion device and a second person operating the first augmented reality companion device.

Where the various conditions determined by decision 802, decision 803, and decision 804 are not met, step 806 comprises the one or more processors of the electronic device delivering subtitles to the content presentation companion device for presentation on its display. If, for example, the first language preference and the second language preference are the same, rather than directing first subtitles to the first augmented reality companion device and second subtitles to the second augmented reality companion device, a single set of subtitles can be delivered to the content presentation companion device, and so forth.

Figure 9:
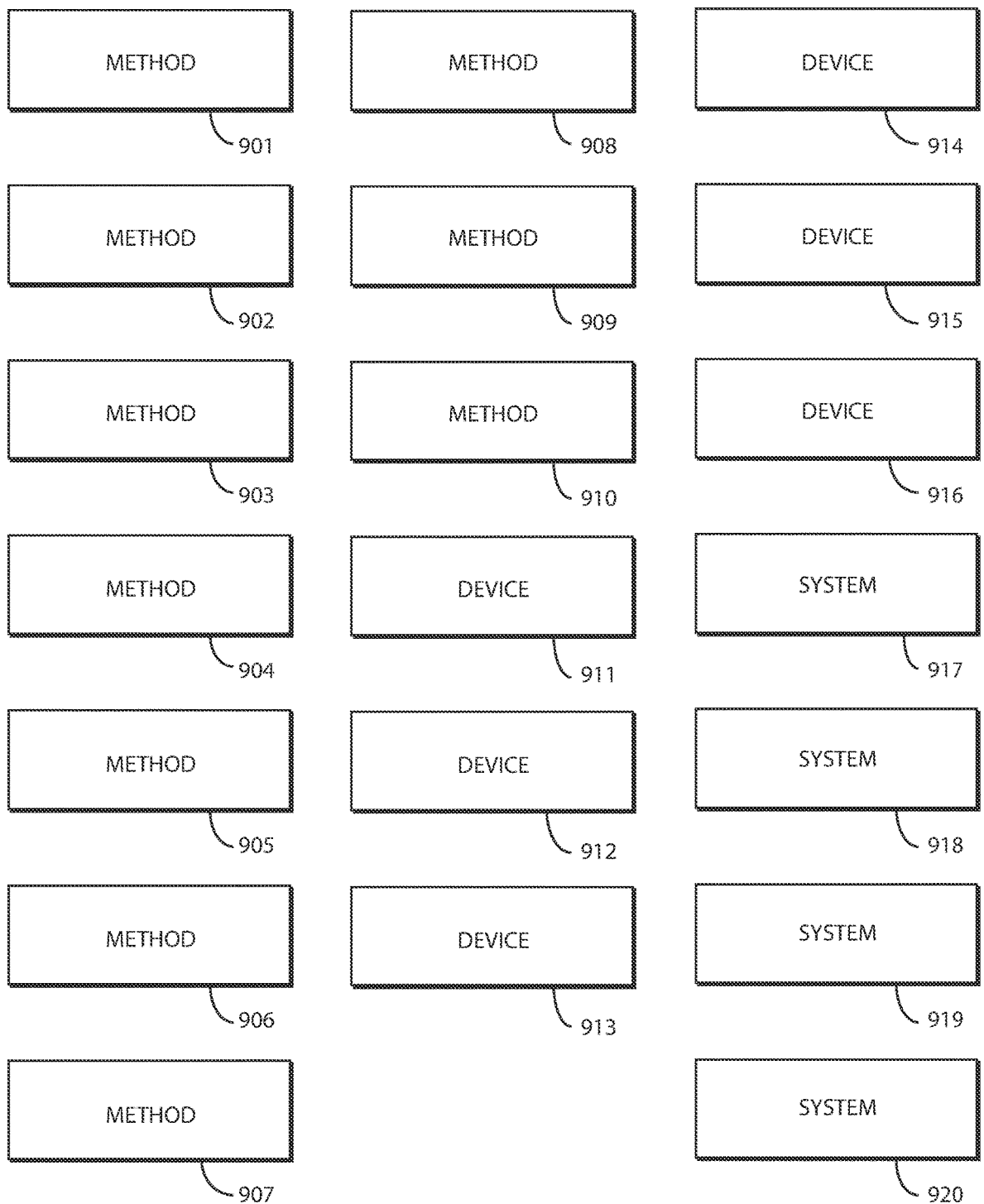
FIG. 9 illustrates various embodiments of the disclosure.

Turning now to FIG. 9, illustrated therein are various embodiments of the disclosure. The embodiments of FIG. 9 are shown as labeled boxes in FIG. 9 due to the fact that the individual components of these embodiments have been illustrated in detail in FIGS. 1-8, which precede FIG. 9. Accordingly, since these items have previously been illustrated and described, their repeated illustration is no longer essential for a proper understanding of these embodiments. Thus, the embodiments are shown as labeled boxes.

At 901, a method in an electronic device comprises detecting, with one or more processors, a communication device electronically in communication with both a content presentation companion device operating as a primary display for the electronic device and an augmented reality companion device. At 901, the method comprises detecting, with one or more sensors, multiple persons being present within an environment of the electronic device while the content presentation companion device is operating as the primary display for the electronic device. At 901, the method comprises redirecting, with the one or more processors, an event notification intended for presentation on the primary display of the electronic device to the augmented reality companion device while the multiple persons are in the environment.

At 902, the method of 901 further comprises causing, by the one or more processors, the communication device to deliver a content offering to the content presentation companion device for presentation to the environment. At 902, the redirecting occurs while the communication device delivers the content offering to the content presentation companion device.

At 903, the method of 902 further comprises determining, with the one or more processors, whether the event notification is related to the content offering. At 903, the redirecting occurs only when the event notification is unrelated to the content offering.

At 904, the event notification of 903 comprises a subtitle associated with the content offering.

At 905, the method of 902 further comprises identifying, with the one or more sensors, one person of the multiple persons within the environment as an authorized user of the electronic device. At 905, the redirecting occurs only when the authorized user of the electronic device is within the environment.

At 906, the method of 905 further comprises detecting, with the one or more sensors, the authorized user of the electronic device operating the augmented reality companion device. At 906, the redirecting only occurs when the authorized user is operating the augmented reality companion device.

At 907, the method of 906 further comprises determining, with the one or more processors, an intended recipient of the event notification. At 907, the redirecting occurs only when the authorized user is the intended recipient of the event notification.

At 908, the method of 906 further comprises determining, with the one or more processors, an event notification type associated with the event notification. At 908, the redirecting occurs only when the event notification type is within a predefined event notification type class. At 909, the predefined event notification type class of 908 is defined by a preconfigured list of user selected event notification types stored within a memory of the electronic device.

At 910, an electronic device comprises a communication device electronically communicating with a content presentation companion device operating as a primary display for the electronic device and an augmented reality companion device. At 910, the electronic device comprises one or more sensors detecting multiple persons within an environment of the electronic device while the content presentation companion device operates as the primary display for the electronic device. At 910, the electronic device comprises one or more processors redirecting an event notification intended for presentation on the primary display to the augmented reality companion device while both the content presentation companion device operates as the primary display for the electronic device and the multiple persons are within the environment of the electronic device.

At 911, the one or more processors of 910 redirect the event notification to the augmented reality companion device only when the one or more sensors detect an owner of the electronic device among the multiple persons within the environment. At 912, the one or more processors of 911 redirect the event notification to the augmented reality companion device only when the owner of the electronic device is the only person of the multiple persons who is an intended recipient of the event notification.

At 913, the one or more processors of 910 redirect the event notification only when the event notification is of a predefined event notification type. At 914, the electronic device of 913 further comprises a memory operable with the one or more processors. At 914, the predefined event notification type of 913 is defined by one a preconfigured list of user selected event notification types stored within a memory of the electronic device.

At 915, the event notification of 910 comprises one or more subtitles associated with a content offering being presented on the content presentation companion device. At 916, the event notification of 910 comprises one of an application generated event notification or incoming electronic communication event notification.

At 917, a system comprises an electronic device comprising one or more sensors, a communication device, and one or more processors. At 917, the system comprises a content presentation companion device electronically in communication with the electronic device. At 917, the system comprises an augmented reality companion device in communication with the electronic device.

At 917, the one or more processors cause the communication device to deliver a content offering to the content presentation companion device for presentation to an environment of the electronic device. At 917, the one or more processors redirect an event notification from the content presentation companion device to the augmented reality companion device when at least one predefined condition is met. At 917, the at least one predefined condition comprises the one or more sensors detecting multiple persons consuming the content offering within the environment of the electronic device.

At 918, the at least one predefined condition of 917 further comprises the one or more sensors identifying an owner of the electronic device among the multiple persons. At 919, the at least one predefined condition of 918 further comprises the one or more sensors identifying the owner of the electronic device operating the augmented reality companion device. At 920, the at least one predefined condition of 919 further comprises the one or more processors determining that the owner of the electronic device is the only person of the multiple persons to whom the event notification is directed.

Figure 10:
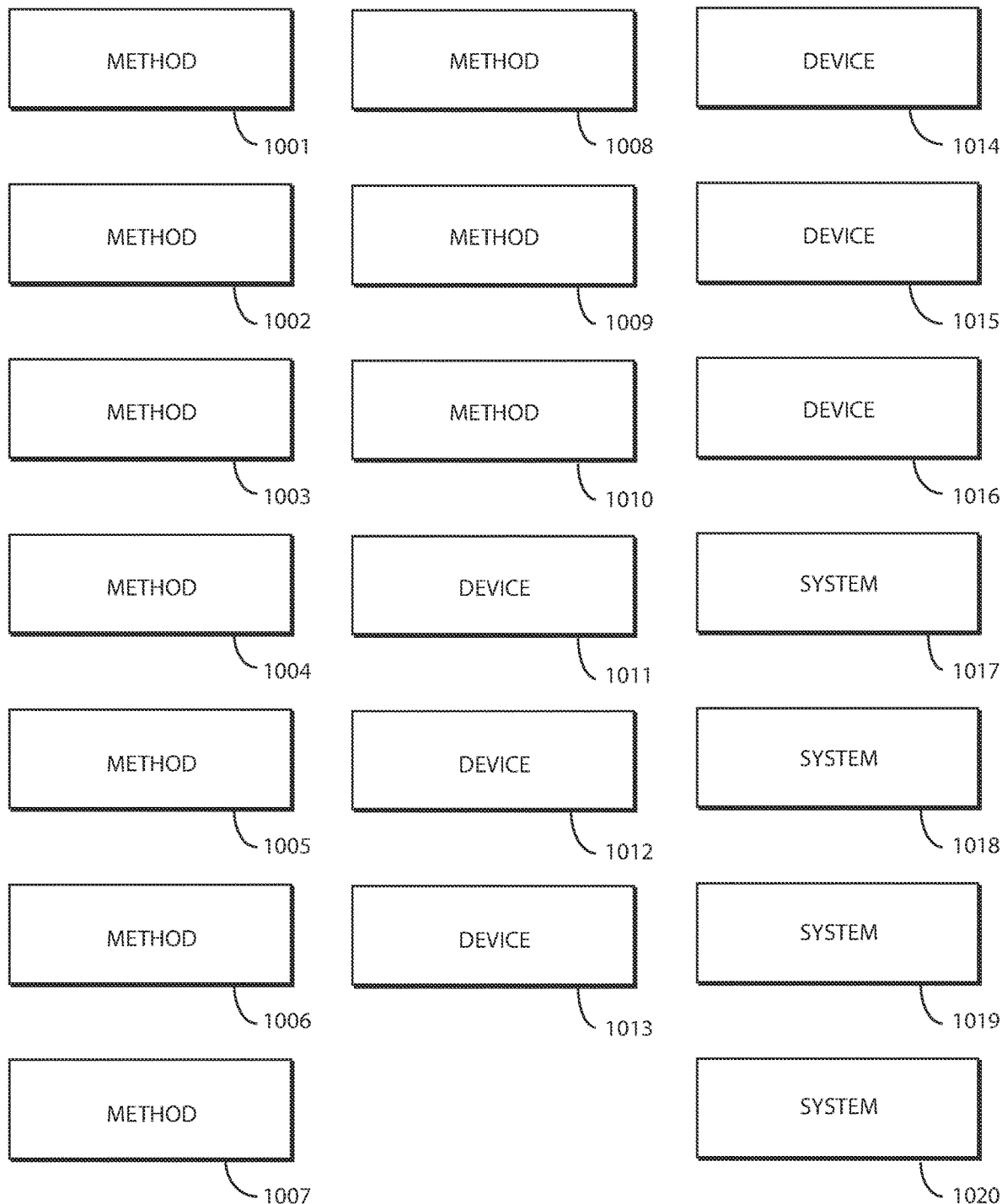
FIG. 10 illustrates various other embodiments of the disclosure.

Turning now to FIG. 10, illustrated therein are still more embodiments of the disclosure. As with FIG. 9 above, the embodiments of FIG. 10 are also shown as labeled boxes in FIG. 10 due to the fact that the individual components of these embodiments have been illustrated in detail in FIGS. 1-8, which precede FIG. 10. Accordingly, since these items have previously been illustrated and described, their repeated illustration is no longer essential for a proper understanding of these embodiments. Thus, the embodiments are shown as labeled boxes.

At 1001, a method in an electronic device comprises causing, with one or more processors, a communication device to electronically deliver a content offering to a content presentation companion device for presentation to an environment of the electronic device. At 901, the method comprises detecting, with the one or more processors, the communication device electronically in communication with both a first augmented reality companion device and a second augmented reality companion device.

At 1001, the method comprises identifying, with one or more sensors, a first person operating the first augmented reality companion device and a second person operating the second augmented reality companion device. At 1001, the method comprises determining, with the one or more processors, a first language preference of the first person and a second language preference of the second person. At 1001, the method comprises causing, with the one or more processors, the communication device to electronically deliver first subtitles associated with the content offering in the first language preference to the first augmented reality companion device and second subtitles associated with the content offering in the second language preference to the second augmented reality companion device.

At 1002, the first language preference and the second language preference of 1001 are different.

At 1003, the method of 1001 further comprises precluding, with the one or more processors, the presentation of either the first subtitles or the second subtitles by the content presentation companion device. At 1004, the method of 1001 further comprises causing, with the one or more processors, the communication device to deliver third subtitles associated with the content offering to the content presentation companion device. At 1005, the third subtitles of 1004 are in a third language preference that is different from both the first language preference and the second language preference.

At 1006, the determining at least one of the first language preference of the first person or the second language preference of the second person of 1001 occurs by voice recognition. At 1007, the determining at least one of the first language preference of the first person or the second language preference of the second person of 1001 occurs by determining a user setting stored within a memory of the electronic device.

At 1008, the content offering of 1001 comprises a movie and the first subtitles and the second subtitles comprise dialogue associated with the movie. At 1009, the content offering of 1001 comprises a sporting event and the first subtitles and the second subtitles comprise scores associated with the sporting event. At 1010, the content offering of 1001 comprises a music video and the first subtitles and the second subtitles comprise song lyrics associated with the music video.

At 1011, an electronic device comprises a communication device electronically delivering a content offering to a content presentation companion device operating as a primary display for the electronic device and communicating with at least two augmented reality companion devices. At 1011, the electronic device comprises one or more sensors identifying a first person operating a first augmented reality companion device of the at least two augmented reality companion devices and a second person operating a second augmented reality companion device of the at least two augmented reality companion devices within an environment of the content presentation companion device while the content presentation companion device operates as the primary display for the electronic device. At 1011, the electronic device comprises one or more processors causing the communication device to electronically deliver first subtitles associated with the content offering in a first language preference of the first person to the first augmented reality companion device and second subtitles associated with the content offering in a second language preference of the second person to the second augmented reality companion device.

At 1012, the electronic device of 1011 further comprises a display. At 1012, the content presentation companion device comprises a monitor having another display that is larger than the display of the electronic device. At 1013, each of the first augmented reality companion device and the second augmented reality companion device of 1012 comprises augmented reality glasses. At 1014, the electronic device of 1011 comprises a memory storing the first language preference and the second language preference.

At 1015, the one or more sensors of 1011 comprise an audio input. At 1015, the one or more processors further determine the first language preference and the second language preference using voice recognition to identify the first language preference and the second language preference from audio received by the audio input while the first person operates the first augmented reality companion device and the second person operates the second augmented reality companion device. At 1016, the first language preference and the second language preference of 1011 are different.

At 1017, a system comprises an electronic device comprising one or more sensors, a communication device, and one or more processors. At 1017, the system comprises a content presentation companion device electronically in communication with the electronic device and presenting a content offering. At 1017, the system comprises at least two augmented reality companion devices in communication with the electronic device.

At 1017, the one or more processors of the electronic device cause causing the communication device to electronically deliver first subtitles associated with the content offering in a first language preference to the a first augmented reality companion device of the at least two augmented reality companion devices and second subtitles associated with the content offering in a second language preference to a second augmented reality companion device of the at least two augmented reality companion devices. At 1017, the first language preference and the second language preference are different.

At 1018, the one or more processors of 1017 cause the communication device to deliver third subtitles in a third language preference to the content presentation companion device. At 1017, the third language preference is different from both the first language preference and the second language preference.

At 1019, the one or more processors of 1017 preclude the presentation of subtitles at the content presentation companion device. At 1020, the one or more processors of 1017 cause the communication device to electronically deliver the first subtitles to the first augmented reality companion device and the second subtitles to the second augmented reality companion device only when the one or more sensors identify a first person operating the first augmented reality companion device and a second person operating the first augmented reality companion device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with one or more processors, a communication device electronically in communication with both:
        a content presentation companion device operating as a primary display for the electronic device; and
        an augmented reality companion device;
    detecting, with one or more sensors, multiple persons being present within an environment of the electronic device while the content presentation companion device is operating as the primary display for the electronic device;
    causing, by the one or more processors, the communication device to deliver a content offering to the content presentation companion device for presentation to the environment;
    redirecting, with the one or more processors, an event notification intended for presentation on the primary display of the electronic device to the augmented reality companion device while the multiple persons are in the environment;
    further comprising determining, with the one or more processors, whether the event notification is related to the content offering and whether the event notification would be of interest to every person of the multiple persons present in the environment, wherein the redirecting is omitted only when the event notification is both related to the content offering and likely of interest to every person of the multiple persons present in the environment.

2. The method of claim 1, wherein the redirecting occurs while the communication device delivers the content offering to the content presentation companion device.

3. The method of claim 1, wherein the content offering comprises a sporting event and the event notification comprises a score update or a player injury update.

4. The method of claim 1, wherein the event notification comprises a subtitle associated with the content offering.

5. The method of claim 1, further comprising identifying, with the one or more sensors, one person of the multiple persons within the environment as an authorized user of the electronic device, wherein the redirecting occurs when the authorized user of the electronic device is within the environment.

6. The method of claim 1, further comprising detecting, with the one or more sensors, an authorized user of the electronic device operating the augmented reality companion device, wherein the redirecting occurs when the authorized user is operating the augmented reality companion device.

7. The method of claim 1, further comprising determining, with the one or more processors, an intended recipient of the event notification, wherein the redirecting occurs when an authorized user is the intended recipient of the event notification.

8. The method of claim 1, further comprising determining, with the one or more processors, an event notification type associated with the event notification, wherein the redirecting occurs when the event notification type is within a predefined event notification type class.

9. The method of claim 8, wherein the predefined event notification type class is defined by a preconfigured list of user selected event notification types stored within a memory of the electronic device.

10. An electronic device, comprising:
    a communication device electronically communicating with a content presentation companion device operating as a primary display for the electronic device and an augmented reality companion device and delivering a content offering to the content presentation companion device for presentation to an environment of the electronic device;
    one or more sensors detecting multiple persons within the environment of the electronic device while the content presentation companion device operates as the primary display for the electronic device; and
    one or more processors redirecting an event notification intended for presentation on the primary display to the augmented reality companion device while both:

the content presentation companion device operates as the primary display for the electronic device; and the multiple persons are within the environment of the electronic device;

unless the one or more processors determine the event notification is both related to the content offering and the event notification would likely be of interest to every person of the multiple persons present in the environment, wherein the one or more processors omit the redirecting of the event notification.

11. The electronic device of claim 10, wherein the one or more processors redirection the event notification to the augmented reality companion device when the one or more sensors detect an owner of the electronic device among the multiple persons within the environment.

12. The electronic device of claim 10, the one or more processors redirecting the event notification to the augmented reality companion device when an owner of the electronic device is the only person of the multiple persons who is an intended recipient of the event notification.

13. The electronic device of claim 10, the one or more processors redirecting the event notification when the event notification is of a predefined event notification type.

14. The electronic device of claim 13, further comprising a memory operable with the one or more processors, wherein the predefined event notification type is defined by one a preconfigured list of user selected event notification types stored within a memory of the electronic device.

15. The electronic device of claim 10, the event notification comprising one or more subtitles associated with a content offering.

16. The electronic device of claim 10, the event notification comprising one of an application generated event notification or incoming electronic communication event notification.

17. A system, comprising:
an electronic device comprising one or more sensors, a communication device, and one or more processors;
a content presentation companion device electronically in communication with the electronic device and operating as a primary display for the electronic device; and
an augmented reality companion device in communication with the electronic device;
the one or more processors causing the communication device to deliver a content offering to the content presentation companion device for presentation to an environment of the electronic device, redirecting an event notification from the content presentation companion device to the augmented reality companion device when at least one predefined condition is met, the at least one predefined condition comprising the one or more sensors detecting multiple persons consuming the content offering within the environment of the electronic device, and omitting the redirecting when one or more processors determine that the event notification is both related to the content offering and the event notification is likely to be of interest to every person of the multiple persons present in the environment.

18. The system of claim 17, the at least one predefined condition further comprising the one or more sensors identifying an owner of the electronic device among the multiple persons.

19. The system of claim 18, the at least one predefined condition further comprising the one or more sensors identifying the owner of the electronic device operating the augmented reality companion device.

20. The system of claim 19, the at least one predefined condition further comprising the one or more processors determining that the owner of the electronic device is the only person of the multiple persons to whom the event notification is directed.

* * * * *